United States Patent
Yoneda et al.

(10) Patent No.: US 9,172,938 B2
(45) Date of Patent: Oct. 27, 2015

(54) CONTENT REPRODUCTION METHOD, CONTENT REPRODUCTION SYSTEM, AND CONTENT IMAGING DEVICE

(71) Applicant: Panasonic Corporation, Osaka (JP)

(72) Inventors: Aki Yoneda, Hyogo (JP); Hiroshi Yahata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/128,674

(22) PCT Filed: Apr. 26, 2013

(86) PCT No.: PCT/JP2013/002845
§ 371 (c)(1),
(2) Date: Dec. 23, 2013

(87) PCT Pub. No.: WO2013/161319
PCT Pub. Date: Oct. 31, 2013

(65) Prior Publication Data
US 2014/0126881 A1 May 8, 2014

Related U.S. Application Data

(60) Provisional application No. 61/639,119, filed on Apr. 27, 2012.

(51) Int. Cl.
*H04N 5/92* (2006.01)
*H04N 9/87* (2006.01)
(Continued)

(52) U.S. Cl.
CPC .............. *H04N 9/87* (2013.01); *G11B 27/10* (2013.01); *H04N 21/2665* (2013.01); *H04N 21/2743* (2013.01); *H04N 21/4223* (2013.01); *H04N 21/84* (2013.01)

(58) Field of Classification Search
CPC .................................. G11B 27/10; H04N 9/87
USPC ............................................................ 386/241
See application file for complete search history.

(56) References Cited

U.S. PATENT DOCUMENTS 6,359,837 B1 * 3/2002 Tsukamoto .................... 368/10
8,503,863 B2 8/2013 Tezuka et al.
(Continued)

FOREIGN PATENT DOCUMENTS

JP 2001-274936 10/2001
JP 2009-303137 12/2009
(Continued)

OTHER PUBLICATIONS

English Translation of Japanese Publication 2009-303137, Dec. 2009.*
(Continued)

*Primary Examiner* — William Tran
(74) *Attorney, Agent, or Firm* — Wenderoth, Lind & Ponack, L.L.P.

(57) ABSTRACT

Each of video content items captured by cameras is associated with metadata describing a time stamp indicating a capturing time and spatial information indicating features of space relating to a camera at the capturing time. In the disclosed content reproduction method, at least one target video content item to be reproduced is selected from the video content items based on the time stamps and pieces of the spatial information described in the respective pieces of metadata, then a reproduction start position of the selected video content item is determined based on a time stamp described in metadata associated with the selected video content item, and the selected video content item is reproduced from the determined reproduction start position.

18 Claims, 17 Drawing Sheets

(51) Int. Cl.
*H04N 21/2743* (2011.01)
*G11B 27/10* (2006.01)
*H04N 21/2665* (2011.01)
*H04N 21/4223* (2011.01)
*H04N 21/84* (2011.01)

(56) References Cited

U.S. PATENT DOCUMENTS

2010/0021129 A1  1/2010  Tezuka et al.
2011/0310259 A1* 12/2011 Mikawa et al. ............ 348/207.1

FOREIGN PATENT DOCUMENTS

JP  2012-005028  1/2012
WO  2009/078132  6/2009

OTHER PUBLICATIONS

International Search Report issued Jul. 30, 2013 in International (PCT) Application No. PCT/JP2013/002845.

* cited by examiner

CONTENT REPRODUCTION METHOD, CONTENT REPRODUCTION SYSTEM, AND CONTENT IMAGING DEVICE

TECHNICAL FIELD

The present invention relates to content reproduction methods, content reproduction systems, and content imaging devices.

BACKGROUND OF THE INVENTION

Background Art

With the wide use of home movie cameras for capturing video, it has become easy for anyone to capture desired videos. Therefore, it often happens that a great many people capture videos of the same scene at the same time.

For example, a father and a mother may capture videos of a sports festival of their child by each using a different movie camera. In this case, rather than watching different videos captured by these cameras, it is preferable to watch the videos as a combined single video having a so-called multi-angle of the two cameras.

In order to provide such a multi-angle video, Patent Literature 1 (PLT 1), for example, discloses a technique in which a camera assigns, as metadata, a time of capturing (namely, a time stamp) to currently-capturing video data.

In the meanwhile, recently, there are video sites, such as YouTube® (www.youtube.com). Through such a video site, a user can freely upload video files generated by the user, and freely watch video files generated by strangers.

CITATION LIST

Patent Literature

[PTL 1] International Publication No. WO2009/078132

SUMMARY OF INVENTION

However, the above-described conventional technique merely searches for different video files generated in the same capturing time, based on time stamps assigned to the video files.

In order to address the above-described problem, an object of the present invention is to provide a content reproduction method, a content reproduction system, and a content imaging device all of which are capable of selecting and reproducing related video content items even if the related video contents are generated by strangers.

In accordance with an aspect of the present invention for achieving the object, there is provided a content reproduction method of selecting at least one video content item from a plurality of video content items captured by a plurality of cameras and reproducing the selected at least one video content item, the video content items each being associated with metadata that describes (a) a time stamp indicating a capturing time and (b) spatial information indicating features of space relating to a corresponding one of the cameras at the capturing time, the content reproduction method comprising: selecting at least one target video content item to be reproduced from among the video content items based on the time stamp and the spatial information described in each of pieces of metadata including the metadata, the pieces of the metadata being associated with a corresponding one of the video content items; determining a reproduction start position of the at least one target video content item based on the time stamp described in the metadata associated with the at least one target video content item; and reproducing the at least one target video content item from the reproduction start position.

It should be noted that the general and specific aspect may be implemented as a system, a method, an integrated circuit, a computer program, and a computer-readable recording medium, such as a Compact Disc-Read Only Memory (CD-ROM), and may be implemented also as a desired combination of them.

The content reproduction method and the like according to the present invention are capable of selecting and reproducing related video content items even if the related video content items are generated by strangers.

Figure 1:
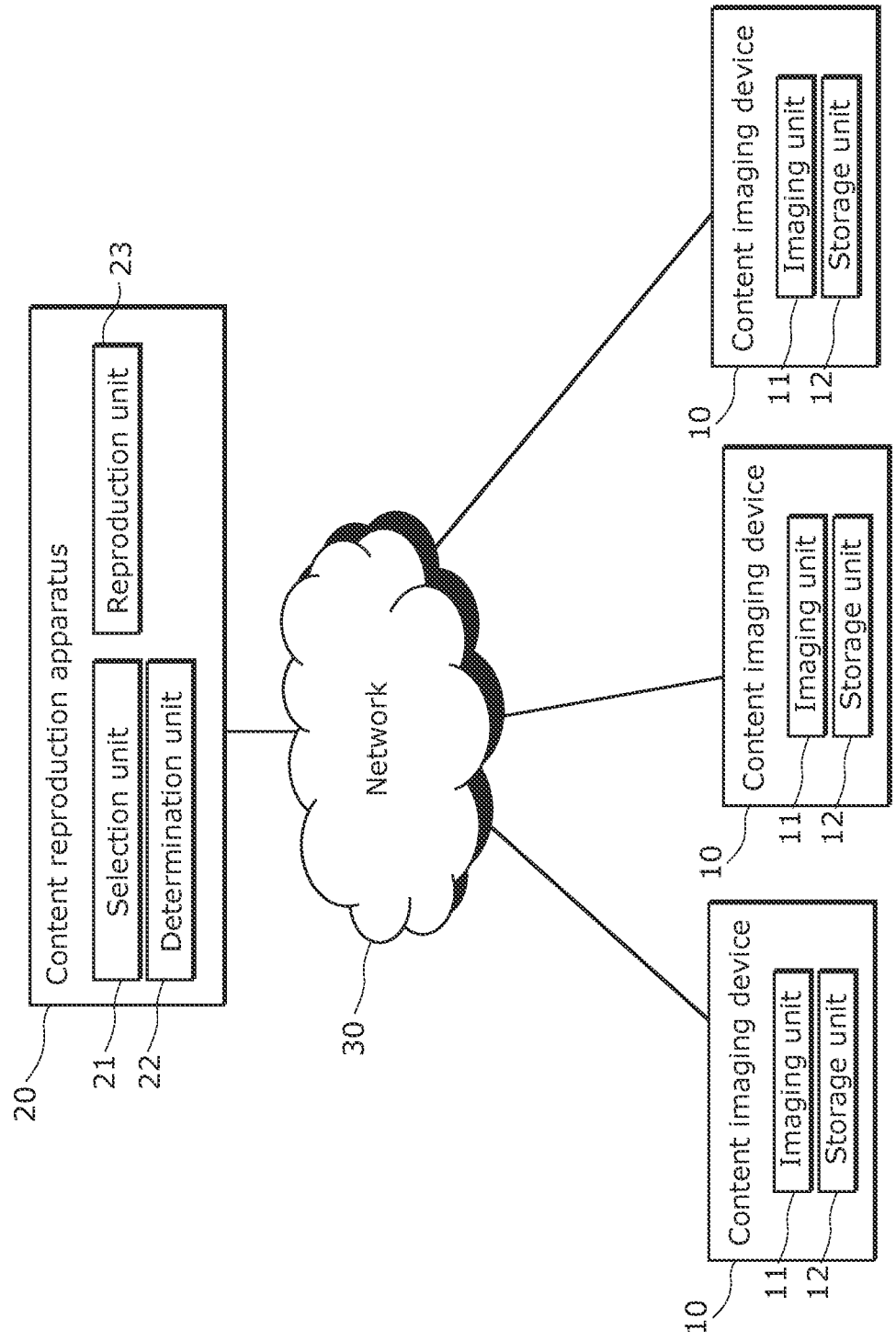
FIG. 1 is a diagram showing a configuration example of a content reproduction system according to Embodiment 1.

DETAILED DESCRIPTION OF INVENTION (Observation Based on which Present Invention has been Conceived)

The inventors of the present invention have found the following problems in the conventional example disclosed in "Background Art".

For example, Patent Literature 1 discloses a technique in which a camera assigns, as metadata, a time of capturing (namely, a time stamp) to currently-capturing video data.

A plurality of cameras generate such pieces of video data and store them as pieces of video contents (hereinafter, referred to also as "video content items") into a reproduction apparatus. The reproduction apparatus therefore can reproduce the video content items generated by the different cameras as if the video content items were a single video file having a plurality of camera angles.

More specifically, for example, it is assumed that one video content item is selected from among the video content items stored in the reproduction apparatus and then reproduced, and that a user presses a button to instruct changing of an angle, for example, during the reproduction. In this case, the reproduction apparatus reads a time stamp assigned to a currently-reproducing scene included in the currently-reproducing video content item, then searches for a different video content item having a time stamp quite similar to the readout time stamp, and eventually produces the searched-out video content item from a scene assigned with the similar time stamp.

However, the technique disclosed in Patent Literature 1 is assumed to be used when a plurality of cameras capture the same event. Therefore, users capturing videos by the cameras are limited to family or friends. The conventional technique does not work for video content items generated by, for example, strangers. In other words, a searched-out video file is often not related to a currently-reproducing video file, and therefore the two video files do not serve as a single video having a so-called multi-angle.

In addition, for example, there is also the situation where two strangers capture different subjects at different places at the same time to generate respective video files (video content items), and upload the video files to a video site such as YouTube®, thereby applying the operation of Patent Literature 1.

In the above situation, if a button for changing an angle is set on a viewing screen of the video site and the same operation as disclosed in Patent Literature 1 is performed, a different video content item is searched out according to time stamps assigned to a currently-reproducing video content item and the searched-out video content item and the searched-out different video content item is displayed. However, these video content items are displayed merely because the different video content item having the same capturing time is searched out. Since the video content items have been captured by strangers, they are not related to each other at all and desired effects cannot be offered. In other words, application of the technique disclosed in the above-described Patent Literature to the video site, videos fail to serve as a single video having a so-called multi-angle.

In order to address the above-described problem, an object of the present invention is to provide a content reproduction method, a content reproduction system, and a content imaging device all of which are capable of selecting and reproducing related video content items even if the related video contents are generated by strangers.

In accordance with an aspect of the present invention for achieving the object, there is provided a content reproduction method of selecting at least one video content item from a plurality of video content items captured by a plurality of cameras and reproducing the selected at least one video content item, the video content items each being associated with metadata that describes (a) a time stamp indicating a capturing time and (b) spatial information indicating features of space relating to a corresponding one of the cameras at the capturing time, the content reproduction method comprising: selecting at least one target video content item to be reproduced from among the video content items based on the time stamp and the spatial information described in each of pieces of metadata including the metadata, the pieces of the metadata being associated with a corresponding one of the video content items; determining a reproduction start position of the at least one target video content item based on the time stamp described in the metadata associated with the at least one target video content item; and reproducing the at least one target video content item from the reproduction start position.

More specifically, it is possible to select a video content item captured in the same space and at the same time, by using spatial information (position information such as latitude, longitude, and the like of a camera at a capturing time, or an orientation of the camera at the capturing time) and a time stamp which are associated with the video content item. It is thereby possible to select a related video content item and reproduce the selected video content item, even if the video content item has been captured by a stranger.

It is possible, for example, that in the selecting of the at least one target video content item, at least two video content items are selected from among the video content items as the at least one target video content item, based on the time stamp and the spatial information described in the each of the pieces of the metadata, and in the reproducing, the at least two video content items are simultaneously reproduced from the reproduction start position.

With this, it is possible to select a relevant video content item, even if the video content item has been captured by a stranger. As a result, a plurality of different video content items can be simultaneously reproduced from the same corresponding time (reproduction start position).

It is further possible, for example, that when at least one first video content item among the video content items has already been reproduced, in the selecting of the at least one target video content item, at least one second video content item is selected as the at least one target video content item, from among the video content items except the at least one first video content item, based on the time stamp and the spatial information described in the each of the pieces of the metadata, and in the reproducing, the at least one first video content item is switched to the at least one second video content item at a position corresponding to the reproduction start position, and the at least one second video content item is reproduced from the reproduction start position.

It is still further possible, for example, that the at least one second video content item is generated by capturing, from a different angle, a same subject as captured in the at least one first video content item.

With this, it is possible to select a second video content item related to a reproducing first video content item, even if the second video content item has been captured by a stranger.

In addition, it is possible to switch the first video content item at a certain time, and reproduce the second video content item from a time (reproduction start position) corresponding to the certain time. As a result, it is possible to select a video content item to be reproduced which captures, from a different angle, the same event as captured in a currently-reproducing video content item.

As described above, even if a different video content item to be switched from a currently-reproducing video content item has been captured by a stranger, it is possible to determine, based on spatial information, that the different video content item captures the same event as captured in the currently-reproducing video content item. Therefore, for example, the first video content item captured by a user and the second video content item captured by a stranger can be reproduced as a single combined video content item having a dynamic multi-angle, as if the second video content item was captured by the user.

It is still further possible, for example, that the spatial information is described in the metadata for each predetermined time interval.

It is still further possible, for example, that the spatial information includes position information indicating a position of the corresponding one of the cameras at the capturing time, and that the position information includes latitude and longitude of the corresponding one of the cameras at the capturing time.

It is still further possible, for example, that the spatial information includes an altitude of the corresponding one of the cameras at the capturing time, and that the spatial information includes an orientation of the corresponding one of the cameras at the capturing time.

It is still further possible, for example, that the spatial information includes at least one of a temperature and a humidity of space in which the corresponding one of the cameras is present at the capturing time.

It is still further possible, for example, that the selecting of the at least one target video content item includes: selecting a plurality of first video content items from among the video content items based on the time stamp described in the each of the pieces of the metadata; and selecting the at least one target video content item from among the selected first video content items based on the spatial information described in the each of the pieces of the metadata, the spatial information being evaluated by an evaluation method defined in a predetermined evaluation mode.

It is still further possible, for example, that the selecting of the at least one target video content item is performed based on the spatial information described in the each of the pieces of the metadata, the spatial information being evaluated by an evaluation method of evaluating the spatial information as defined in an evaluation mode designated from among a plurality of evaluation modes.

It is thereby possible to evaluate the spatial information in an evaluation mode according to details such as a genre of a target video content item to be reproduced. As a result, more appropriate video content item can be selected.

It is still further possible, for example, that the selecting of the at least one target video content item is performed by using an evaluation method of evaluating the spatial information, the evaluation method being defined in an evaluation mode designated by a user from among a plurality of evaluation modes.

With this, since the user designates the evaluation mode possible to select a video content item which the user prefers more.

It is still further possible, for example, that in the selecting of the at least one target video content item is performed based on a subject captured in the at least one target video content item in addition to the time stamp and the spatial information described in the each of the pieces of the metadata.

It is still further possible, for example, that the selecting of the at least one target video content item includes: selecting at least two video content items based on the time stamp and the spatial information described in the each of the pieces of the metadata; and selecting, from among the at least two video content items, the at least one target video content item capturing a same subject as a subject captured in a currently-reproducing video content item.

With this, it is possible to select a video content item including a subject in which the user is more interested.

It is still further possible, for example, that the subject is a person.

In accordance with another aspect of the present invention for achieving the object, there is provided a content reproduction system that selects a plurality of video content items and reproduces the video content items, the content reproduction system comprising: a plurality of content imaging devices each including a camera that captures a video content item; and the content reproduction apparatus that selects at least one video content item from video content items captured by the content imaging devices and reproduces the at least one video content item, wherein each of the video content items is associated with metadata that describes (a) a time stamp indicating a capturing time and (b) spatial information indicating features of space relating to the camera at the capturing time, the content reproduction apparatus includes: a selection unit configured to select at least one target video content item to be reproduced from among the video content items based on the time stamp and the spatial information described in each of pieces of metadata including the metadata, the pieces of the metadata each being associated with a corresponding one of the video content items; a determination unit configured to determine a reproduction start position of the at least one target video content item based on the time stamp described in the metadata associated with the at least one target video content item; and a reproduction unit configured to reproduce, from the reproduction start position determined by the determination unit, the at least one target video content item selected by the selection unit.

It is also possible, for example, that the content imaging device further includes: a camera capturing a video content item; a storage unit configured to store the video content item captured by the camera associated with metadata describing (a) a time stamp indicating a capturing time and (b) spatial information indicating features of space related to the camera at the capturing time.

It is further possible, for example, that the spatial information includes an orientation of the camera at the capturing time.

It should be noted that the general and specific aspects may be implemented as a system, a method, an integrated circuit, a computer program, and a computer-readable recording medium, such as a Compact Disc-Read Only Memory (CD-ROM), and may be implemented also as a desired combination of them.

Hereinafter, the content reproduction system and the like according to embodiments of the present invention are described in greater detail with reference to the accompanying Drawings.

It should also be noted that all the embodiments described below are specific examples of the present invention. Numerical values, shapes, materials, constituent elements, arrangement positions and the connection configuration of the constituent elements, steps, the order of the steps, and the like described in the following embodiments are merely examples, and are not intended to limit the present invention. Therefore, among the constituent elements in the following embodiments, constituent elements that are not described in independent claims that show the most generic concept of the present invention are described as elements constituting more desirable configurations.

Embodiment 1

Figure 2:
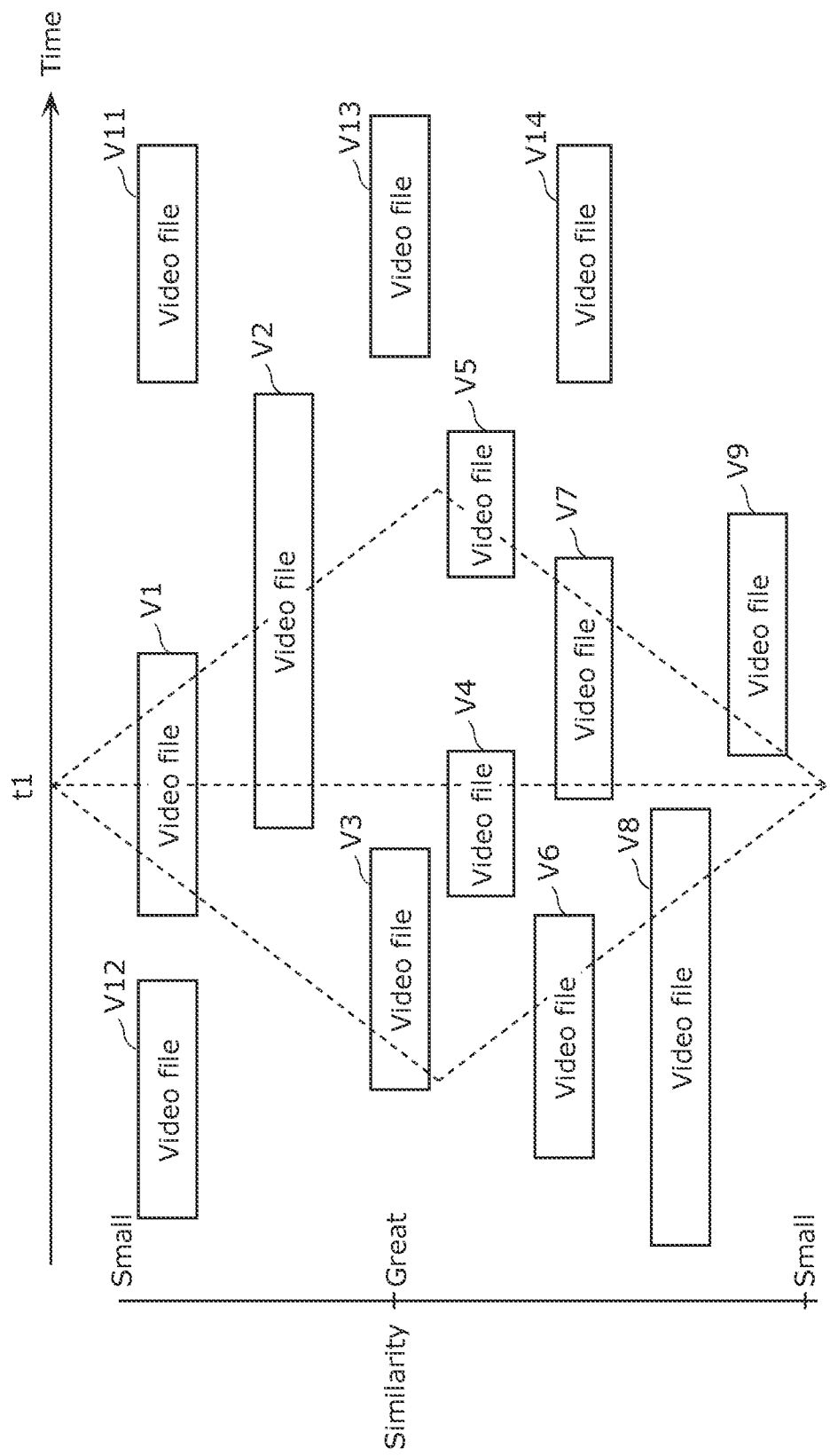
FIG. 2 is a diagram for explaining an example of a method of selecting video contents according to Embodiment 1.
Figure 3:
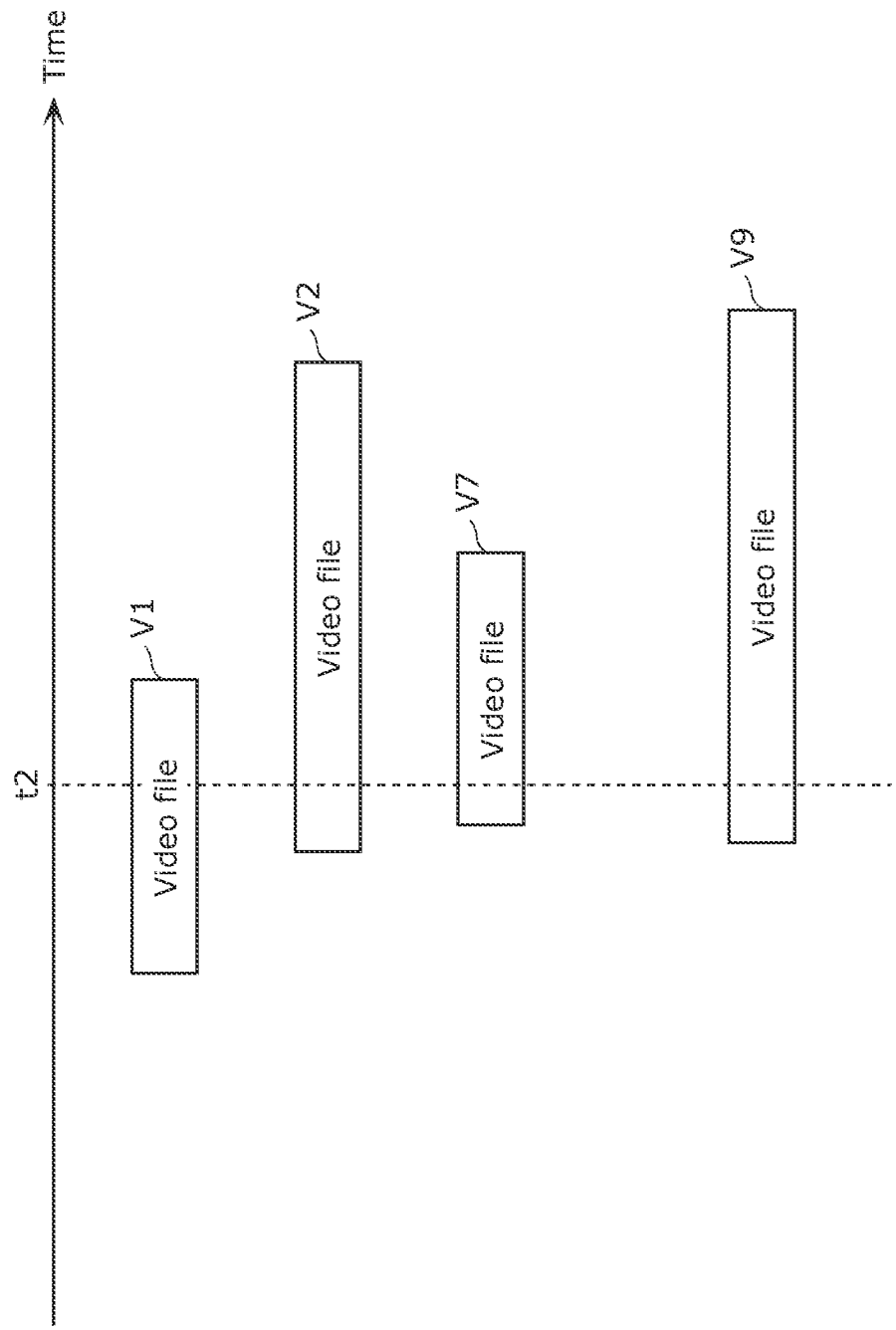
FIG. 3 is a diagram for explaining another example of the method of selecting video content items according to Embodiment 1.
Figure 4:
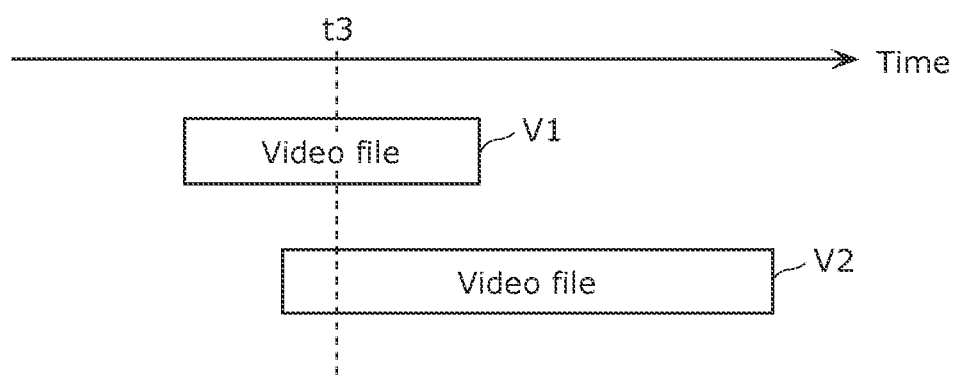
FIG. 4 is a diagram for explaining still another example of the method of selecting video content items according to Embodiment 1.

FIG. 1 is a diagram showing a configuration example of a content reproduction system according to Embodiment 1. Each of FIGS. 2 to 4 is a diagram for explaining an example of a method of selecting video content items according to Embodiment 1. Each of FIGS. 5A to 6B is a diagram for explaining an example of a method of reproducing video content items according to Embodiment 1.

The content reproduction system shown in FIG. 1 includes a plurality of content imaging devices 10 and a content reproduction apparatus 20. The content reproduction system selects video content items and reproduces the selected video content items. In the present embodiment, the content imaging devices 10 are connected to the content reproduction apparatus 20 via a network 30.

The content imaging devices 10 generate video content items independently. Each of the content imaging devices 10 includes an imaging unit 11 and a storage unit 12.

The imaging unit 11 is a camera that captures video content items.

The storage unit 12 holds each video content item captured by the imaging unit 11 in association with metadata that describes a time stamp and spatial information. The time stamp indicates a time of capturing. The spatial information indicates features of space captured by the imaging unit 11. It should be noted that the metadata may be described for each picture included in a video content item, for each predetermined number of pictures included in a video content item, or for each predetermined time period. The spatial information may be described in the metadata for each predetermined time interval.

Here, the spatial information includes at least, for example, an orientation at the time when the imaging unit 11 captures a corresponding video content item (at a capturing time). It should be noted that the spatial information may include not only an orientation but also any data indicating features of space. For example, the spatial information may include not only (a) an orientation but also (b) position information indicating a position of the camera at the capturing time, (b) latitude and longitude of the camera at the capturing time, (c) an altitude of the camera at the capturing time, or (d) at least one of a temperature and a humidity of the space in which the camera exists at the capturing time. It is also possible that the spatial information includes an appropriate combination of at least one of the orientation, the position information, the latitude and longitude, the altitude, and the temperature or humidity. As long as the spatial information indicates features of the space relating to the camera, the spatial information is not limited to the above example.

As described above, each of video content items is associated with metadata that describes (a) a time stamp indicating a capturing time and (b) spatial information indicating features of space relating to the camera at the capturing time.

The content reproduction apparatus 20 selects at least one video content item from among video content items captured by the content imaging devices 10, and reproduces the selected video content item(s). The content reproduction apparatus 20 includes a selection unit 21, a determination unit 22, and a reproduction unit 23.

The selection unit 21 selects a target video content item to be reproduced from among a plurality of video content items based on a time stamp and spatial information described in metadata.

It is also possible, for example, that the selection unit 21 selects, as target video content items, at least two video content items from among a plurality of video content items based on time stamps and pieces of spatial information described in respective pieces of metadata. By referring to an example shown in FIG. 2, video files V1 to V10 having time stamps around time t1 and similar pieces of spatial information (which are included in a region shown by a dotted line in FIG. 2) are selected from among video files V1 to V14. It should be noted that, in FIG. 2, a vertical axis indicates a similarity of spatial information, and a horizontal axis indicates a time indicated by a time stamp (time). It is seen that it is possible that video files having a greater similarity of spatial information are selected from a wider region regarding a time.

It is further possible that, if the reproduction unit 23 has already reproduced at least one first video content item among a plurality of video content items, the selection unit 21 selects, as target video content item(s), at least one second video content item from among video content items except the first video content item based on time stamp(s) and piece(s) of spatial information described in piece(s) of metadata. Here, the second video content item is a video content item generated by capturing a subject from an angle different from an angle of the first video content item capturing the same subject. In the example shown in FIG. 2, for example, if the video file V1 has already been reproduced as a first video content item, video files V2 to V10 having time stamps around time t1 and similar pieces of spatial information (which are included in the region shown by the dotted line in FIG. 2) are selected from among the video files V2 to V14 except the video file V1. Here, the selection unit 21 may select a single video content item to be reproduced.

The determination unit 22 determines a reproduction start position of a target video content item selected by the selection unit 21, based on a time stamp described in metadata associated with the target video content item. In an example shown in FIG. 3 or an example shown in FIG. 4, time t2 or time t3 is determined as a reproduction start position based on time stamps described in pieces of metadata each associated with a corresponding one of the video content items (video files) selected by the selection unit 21.

The reproduction unit 23 reproduces the video content item(s) selected by the selection unit from the reproduction start position determined by the determination unit 22.

Figure 5A:
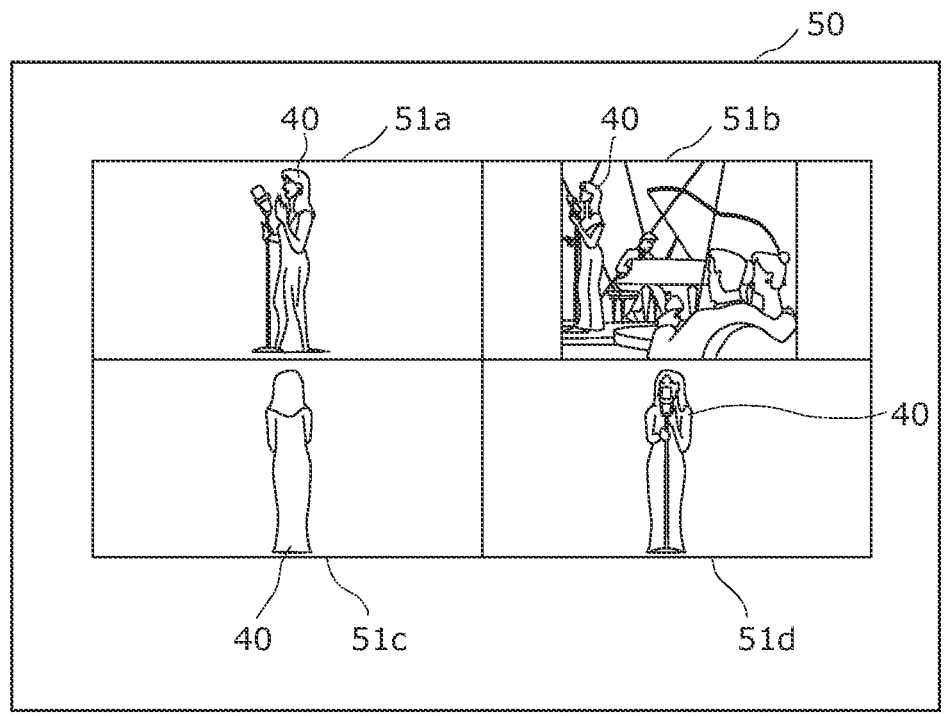
FIG. 5A is a diagram for explaining an example of a method of reproducing video content items according to Embodiment 1.
Figure 5B:
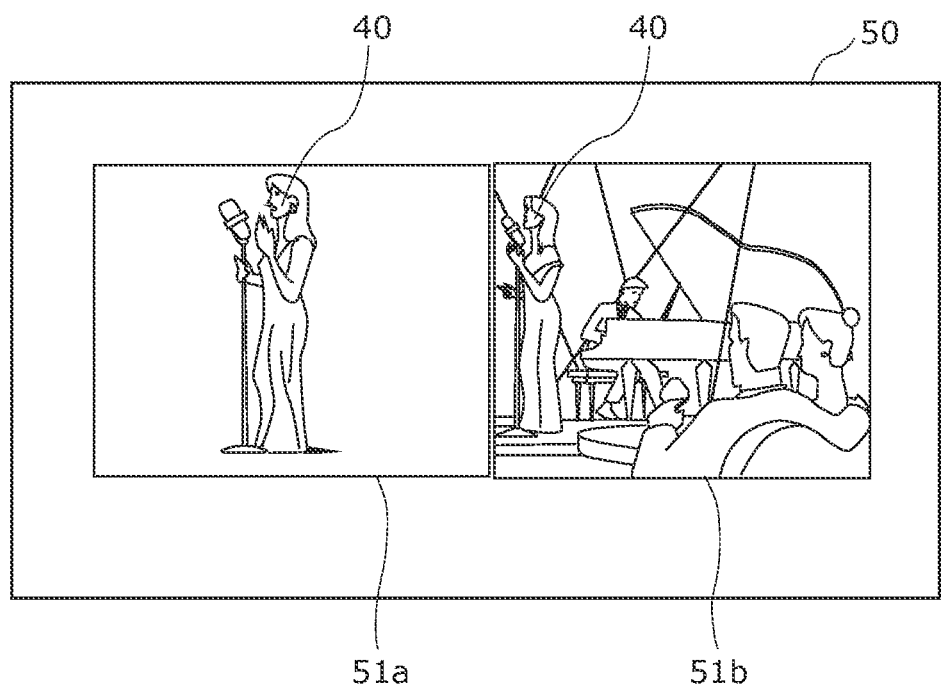
FIG. 5B is a diagram for explaining another example of the method of reproducing video content items according to Embodiment 1.

Here, it is also possible that the reproduction unit 23 simultaneously reproduces at least two target video content items selected by the selection unit 21 from the reproduction start position on the same screen. In the example shown in FIG. 3, among target video files V1 to V14 selected by the selection unit 21, the reproduction unit 23 reproduces video files V1, V2, V7, and V9 having time stamps of or after time t2 as a reproduction start position simultaneously from the reproduction start position (time t2) on the same screen as shown in FIG. 5A, for example. Here, FIG. 5A shows an example where video files V1, V2, V7, and V9 each capturing a singer 40 are simultaneously displayed on four divided screens 51*a* to 51*d*, respectively, on the same screen of a display 50. It should be noted that the reproduction unit 23 may reproduce two video content items. In this case, as shown, for example, in FIG. 5B, the video files V1 and V2 capturing the singer 40 may be simultaneously displayed on two divided screens 51*a* and 51*b*, respectively, on the same screen of the display 50.

Figure 6A:
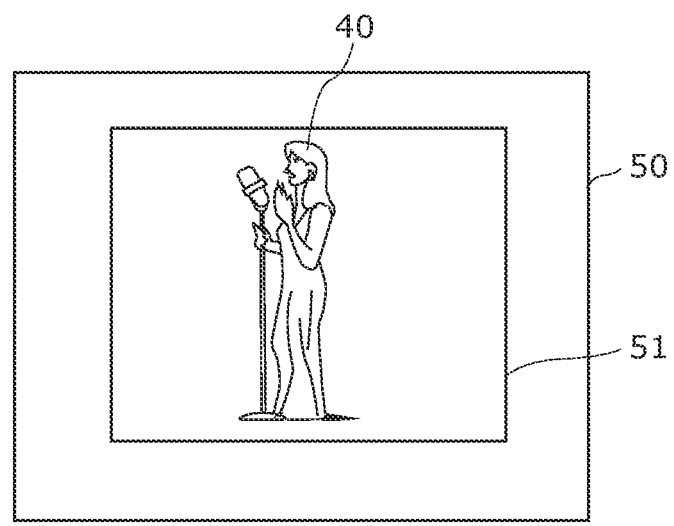
FIG. 6A is a diagram for explaining an example of a method of reproducing a video content item according to Embodiment 1.
Figure 6B:
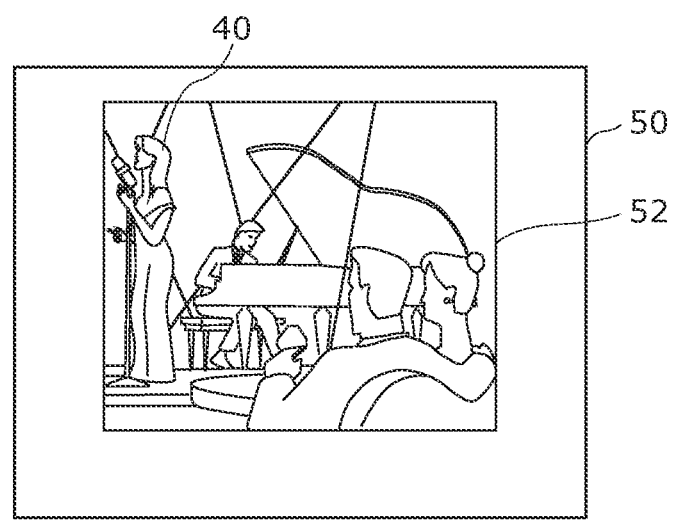
FIG. 6B is a diagram for explaining another example of the method of reproducing a video content item according to Embodiment 1.

It is still further possible that, if the reproduction unit 23 is reproducing at least one first video content item among a plurality of video content items, the reproduction unit 23 switches the first video content item to a second video content item selected by the selection unit 21 as a target video content item at a position corresponding to a reproduction start position, and reproduces the second video content item from the reproduction start position. In the example shown in FIG. 4, for example, as shown in FIG. 6A, it is assumed that the video file V1 is currently reproduced as a first video content item (screen 51). In this case, at time t3 as a reproduction start position, the reproduction unit 23 switches the video file V1 to, for example, the video file V2 (on a screen 52) having a time stamp of or after time t3 as the reproduction start position, among the video files V2 to V14 except the video file V1. As shown in FIG. 6B, the reproduction unit 23 reproduces the video file V2 (on the screen 52) from time t3 as the reproduction start position. Here, FIG. 6A shows an example where the video file V1 capturing the singer 40 is reproduced on the screen 51 of the display 50. On the other hand, FIG. 6B shows an example where the video file V2 capturing the singer 40 from a different angle is reproduced on the screen 52 of the display 50.

Next, operation performed by the content reproduction system having the above-described configuration is described with reference to the figures.

Figure 7:
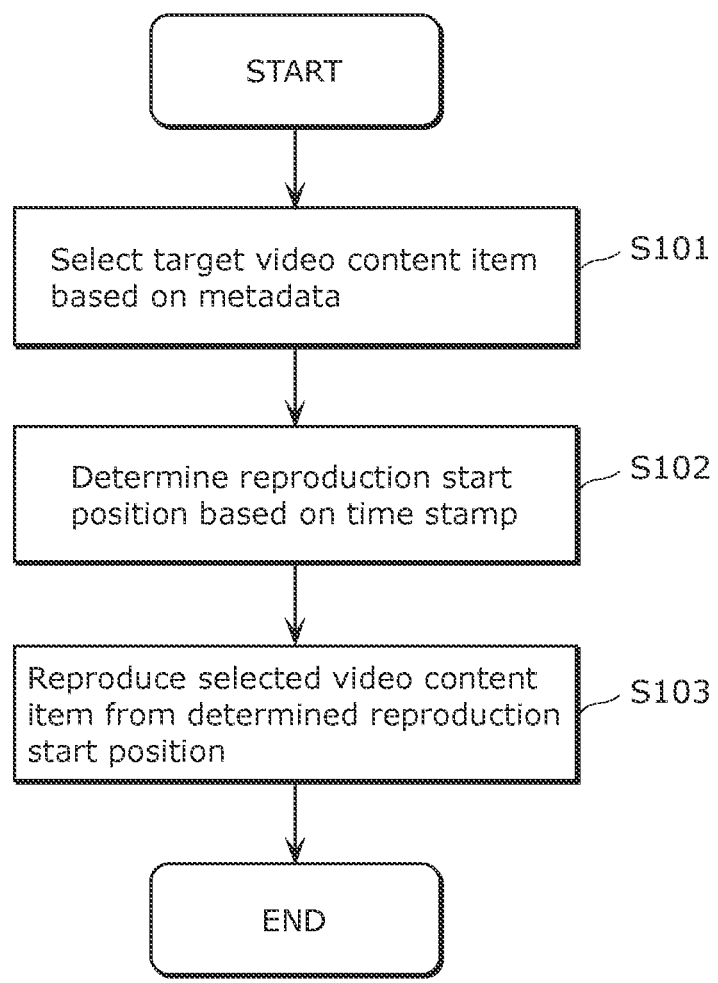
FIG. 7 is a flowchart of content reproduction performed by the system according to Embodiment 1.

FIG. 7 is a flowchart of content reproduction performed by the system according to Embodiment 1.

First, at least one target video content item is selected from among a plurality of video content items based on a time stamp and spatial information described in metadata (S101). Here, since detailed example and the like have already been given above, the step is not described in detail again.

Next, a reproduction start position is determined based on the time stamp described in the metadata associated with the selected target video content item(s) (S102). Here, since the example and the like have already been described above, the step is not described in detail here.

Next, the selected video content item is reproduced from the determined reproduction start position (S103). Here, since the example and the like have already been described above, the step is not described in detail here.

As described above, the content reproduction system performs content reproduction by selecting at least one video content item from a plurality of video content items captured by different cameras, and reproducing the selected video content item(s).

Next, an example of the content imaging device 10 according to Embodiment 1 is described as Example 1.

Example 1

Figure 8:
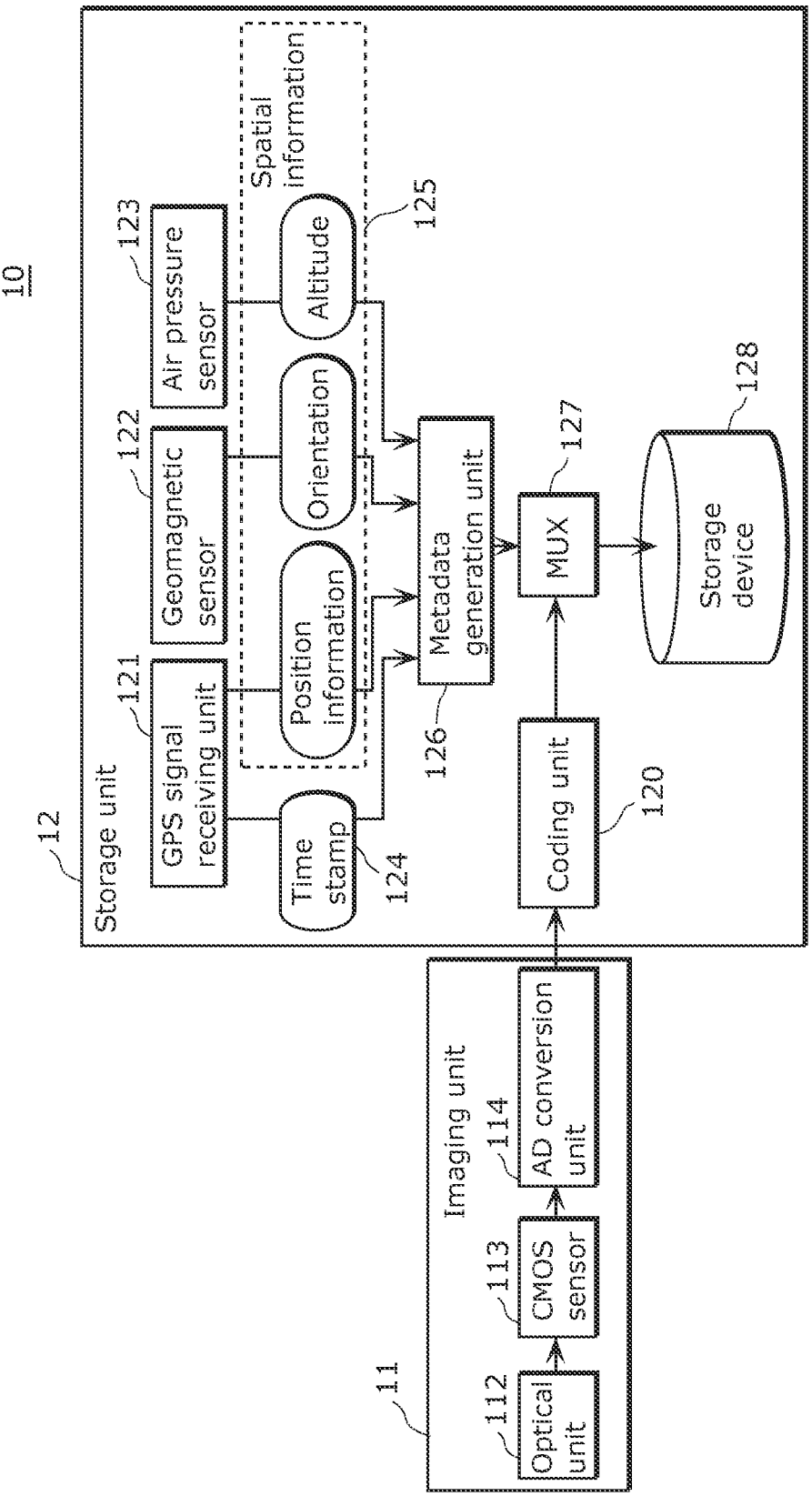
FIG. 8 is a block diagram showing an example of a structure of a content imaging device according to Example 1.

FIG. 8 is a block diagram showing an example of a structure of the content imaging device according to Example 1.

As shown in FIG. 8, the imaging unit 11 includes an optical unit 112, a Complementary Metal-Oxide Semiconductor (CMOS) sensor 113, and an Analog-Digital (AD) conversion unit 114.

The optical unit 12 includes a lens, a diaphragm, and the like to obtain light.

The CMOS sensor 113 receives the light (light ray) obtained by the optical unit 112 and converts the light into analog signals (generates analog signals).

The AD conversion unit 114 converts the analog signals generated by the CMOS sensor 113 into digital signals.

It should be noted that the means for obtaining the above digital signals may be any other means. For example, a Charge-Coupled Device (CCD) sensor may be used instead of the CMOS sensor 113.

Furthermore, as shown in FIG. 8, the storage unit 12 includes a coding unit 120, a Global Positioning System (GPS) signal receiving unit 121, a geomagnetic sensor 122, a metadata generation unit 126, a Multiplexer (MUX) 127, and a storage device 128.

The storage unit 12 holds each video content item captured by the imaging unit 11 in association with metadata that describes a time stamp and spatial information. The time stamp indicates a time of capturing. The spatial information indicates features of space captured by the imaging unit 11. In the present example, the storage unit 12 holds video data generated by the imaging unit 11 in a format that allows the video data to be read out later.

The coding unit 120 performs compression coding of the digital signal (video data) provided from the imaging unit 11. A method for the compression coding may be any compression method among international standards MPEG1, MPEG2, MPEG4, H.264, and the like. The present example adopts AVCHD that is standardized as a video coding method especially for movie cameras. This is because AVCHD standard can record, for each picture included in coded video data, a time stamp and spatial information in a format compliant to EXIF standard.

The GPS signal receiving unit 121 receives radio waves from GPS satellites to obtain position information (latitude, longitude) of the content imaging device 10 (hereinafter, referred to as a "camera) on the earth. GPS signals include time information provided from an atomic clock stored in a GPS satellite. Therefore, the GPS signal receiving unit 121 may obtain a time stamp 124 from GPS signals.

The geomagnetic sensor 122 detects an angle of the camera (orientation such as north, south, east or west), namely, an orientation of the camera.

The air pressure sensor 123 detects a height above sea level of the camera, in other words, an altitude of the camera, based on the phenomenon that the air pressure is reduced in a higher position.

Here, the spatial information 125 includes, as shown in FIG. 8, at least one of the above-described position information, orientation, and altitude.

The metadata generation unit 126 generates metadata from the time stamp 124 obtained by the GPS signal receiving unit 121 and the spatial information 125 generated by at least one of the geomagnetic sensor 122 and the air pressure sensor 123. For example, if video data is stored in AVCHD format in the storage unit 12, the metadata generation unit 126 generates metadata encoded in EXIF format.

It should be noted that, in metadata associated with a generated video data, spatial information 125 may be recorded for each picture. However, the present invention is not limited to the above. For example, it is also possible that, in metadata, spatial information including data such as representative position information is recorded (described) for single video data, it is further possible that, in metadata, plural pieces of spatial information are recorded (described) for each predetermined time period, not for each picture, or that a piece of spatial information is recorded (described) appropriately at a change of scene.

The present example has described the case of using (a) a time for each captured scene, namely, the time stamp 124, and (b) the spatial information 125 including position information, orientation, altitude, and the like of the capturing camera. However, the above-described method is not necessarily used to obtain the time stamp 124 and the spatial information 125.

For example, the camera may obtain the time stamp 124 from a clock embedded in the camera.

The camera may obtain position information not from GPS signals. For example, the camera communicates with a wireless Local Area Network (LAN) device and thereby obtains a Media Access Control (MAC) address uniquely assigned to the wireless LAN device. The camera may search for a database holding information of a setting position of the wireless LAN device on the Internet by using the MAC address as a key, so as to detect the position of the wireless LAN device to obtain position information of the camera. This method is advantageous, in particular, in the situation where GPS radio waves cannot be received.

There would also be the situation where the camera can receive neither radio waves of GPS signals nor radio waves of a wireless LAN. In the situation, the camera stores information of a position at which the camera can receive such radio waves. Then, the camera may relatively detect, by using an acceleration sensor or the like, a travel distance or the like of the camera which is measured from the position at which the radio waves have been received, thereby determining a current position of the camera.

The camera may obtain position information of the camera by using standard radio waves for time setting, although such position information has a quite large error. In this case, the position information is determined simply as, for example, western Japan or eastern Japan. However, the effects of the present invention can be offered, if necessary position information, in other words, a required accuracy of spatial information is enough. It is also possible that the camera receives radio waves such as radio waves of a mobile telephone, and determines a base station that has emitted the radio waves, thereby determining a position of the camera as position information.

It should be note that, if the air pressure sensor 123 detects an altitude directly from an air pressure, the detected altitude value sometimes has an error due to, for example, a change in the weather. In this case, the camera may obtain the state of the weather from a database on the Internet, and corrects the error of the altitude detected by the air pressure sensor 123. It should be noted that the camera may determine an altitude not from an air pressure (in other words, not using the air pressure sensor 123), but from GPS signals. Of course, a user of the camera may input, by hands, position information, an orientation, and an altitude of the camera. In this case, the user may input the position information, the orientation, and the altitude of the camera by hands every time the user uses the camera to capture video, or, after the user's inputting, a change of the pieces of information since the user's inputting is relatively determined by using an acceleration sensor or the like.

It should be noted that the spatial information 125 may not be the specific numerical value as described above, but may be abstract information. For example, by using a temperature indicator, abstract position information of the camera, such as a "hot place" or a "cold place", may be obtained, and then recorded (described) as the spatial information 125 to the metadata. Likewise, for example, by using a humidity indicator, abstract position information of the camera, such as a "dry place" or a "wet place", may be set as the spatial information 125. Furthermore, for example, by using a microphone, abstract position information of the camera, such as a "noisy place" or a "quiet place", may be set as the spatial information 125.

As described above, although the spatial information 125 can be obtained by various methods, a reliability of the obtained spatial information 125 varies depending on the obtaining method. For example, position information obtained by using a wireless LAN device is less reliable than position information obtained by using GPS signals. It is therefore possible to assign, to the spatial information 125, a reliability depending on the method of obtaining the position information.

The MUX 127 is a multiplexer that multiplexes (a) video data coded by the coding unit 120 and (b) metadata generated by the metadata generation unit 126, and stores the resulting data to the storage device 128. If, for example, a format of data stored in the storage device 128 is AVCHD format, the MUX 127 stores each picture in EXIF format.

The storage device 128 is a Hard Disk Drive (HDD), a flash memory, or the like which is stored in the camera.

It should be noted that video data coded by the coding unit 120 and metadata generated by the metadata generation unit 126 are not necessarily multiplexed to be stored in the storage device 128. It is also possible to upload such data directly to a server on the Internet, for example. It should be noted that the video data coded by the coding unit 120 and metadata generated by the metadata generation unit 126 are not necessarily multiplexed as long as the video data and the metadata are associated with each other.

Next, an example of the content reproduction apparatus according to Embodiment 1 is described with reference to Example 2.

Example 2

Figure 9:
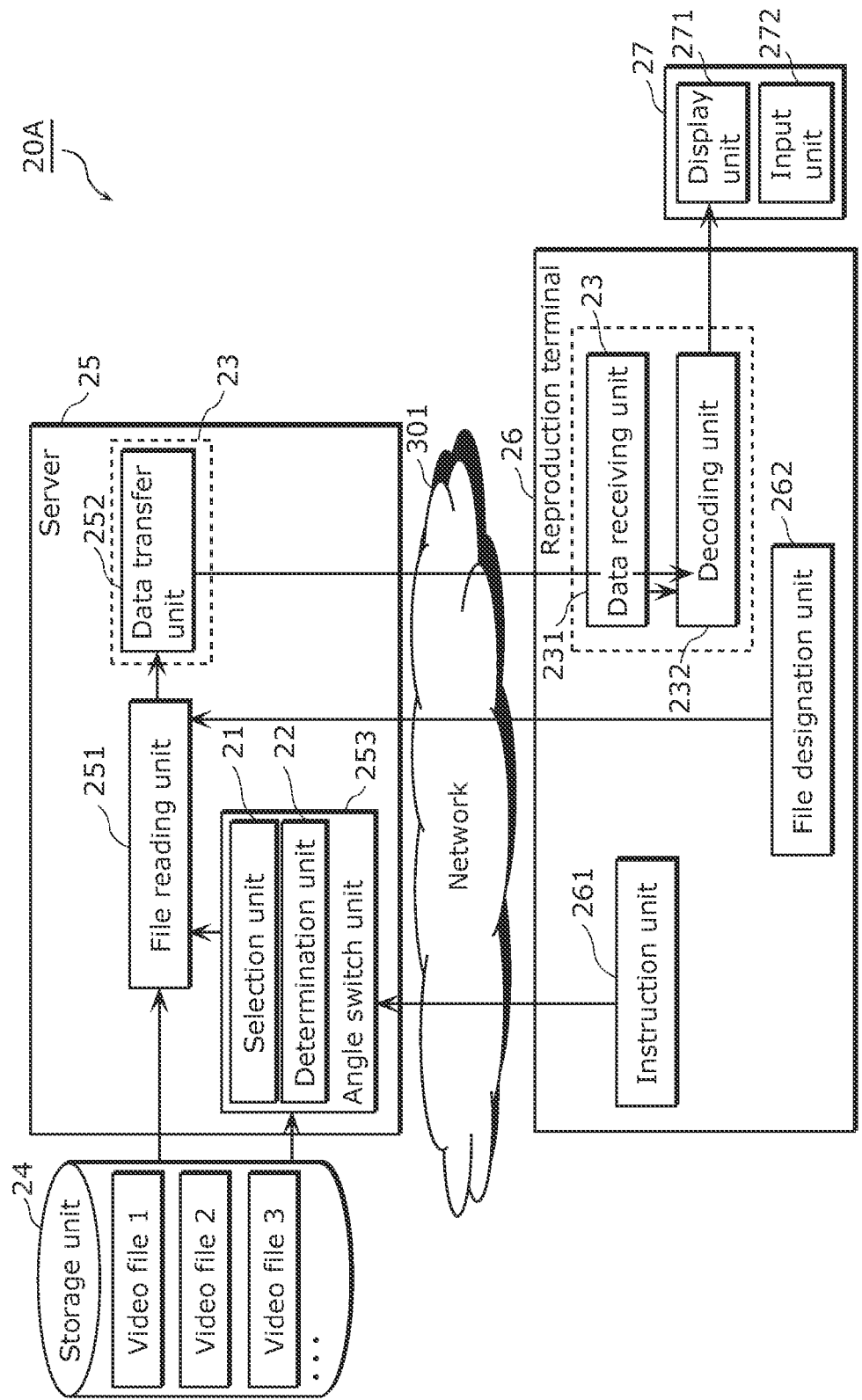
FIG. 9 is a diagram showing an example of a structure of a content imaging device according to Example 2.
Figure 10:
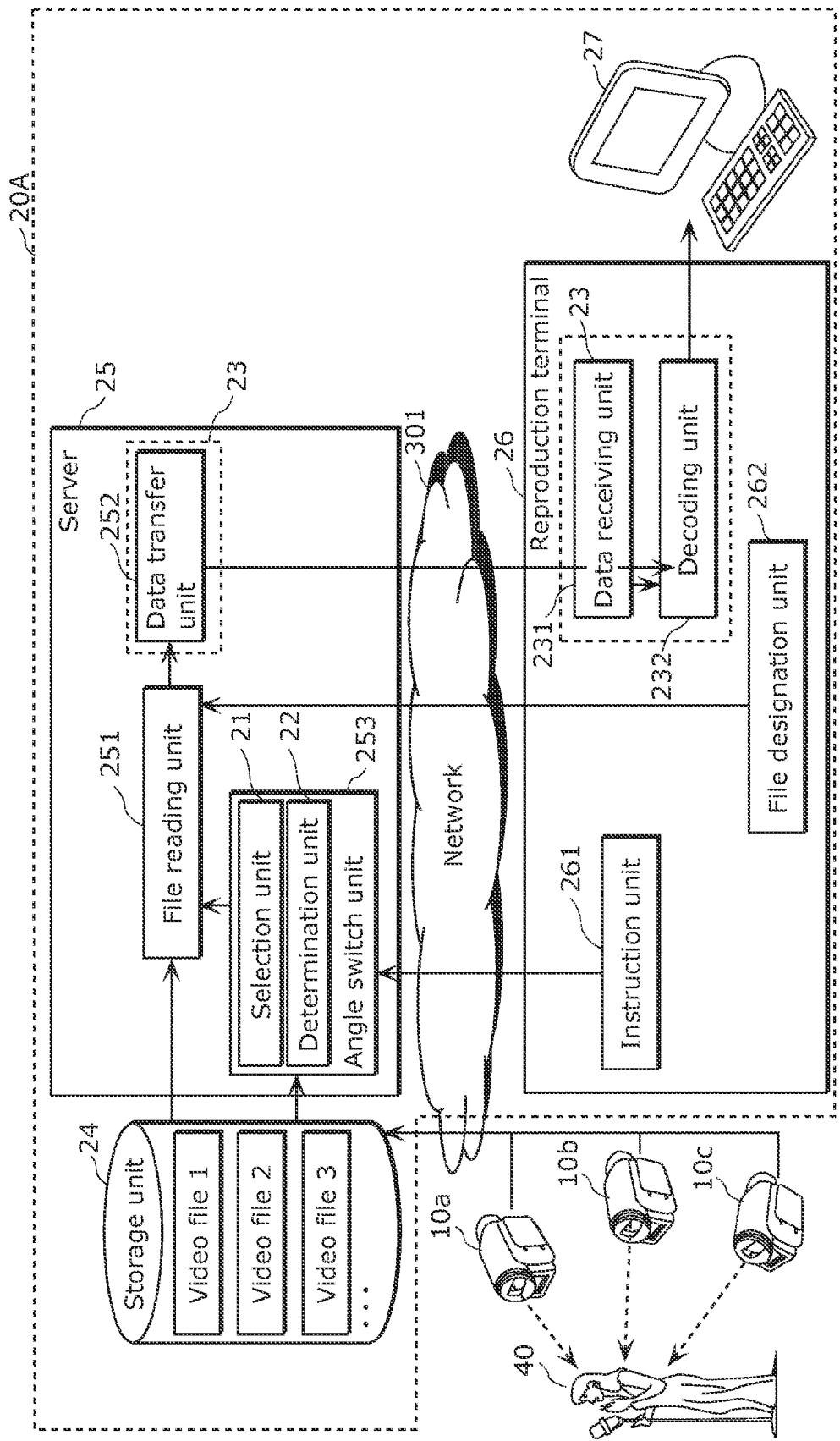
FIG. 10 is a diagram showing an example of an application of a content reproduction apparatus according to Example 2.

FIG. 9 is a block diagram showing an example of a structure of the content reproduction device according to Example 2. FIG. 10 is a diagram showing an example of an application of the content reproduction apparatus according to Example 2.

As shown in FIGS. 9 and 10, the content reproduction apparatus 20A includes: a server 25 having a storage unit 24; and a reproduction terminal 26 having a display apparatus 27. The server 25 and the reproduction terminal 26 are connected to each other via a network such as the Internet.

In the present example, it is assumed that, while the reproduction terminal 26 is reproducing a first video content item, the server 25 selects a second video content item from among a plurality of video content items except the first video content item, and then the reproduction terminal 26 reproduces the selected second video content item.

It is assumed in the present example that, as shown in FIG. 10, three people who do not know one another, for example, use respective three content imaging devices 10 (cameras 10a to 10c) to capture a stage of the same singer 40, and then, via the network 301, the resulting video files (video content items) capturing the singer 40 are uploaded to the server 25. It is also assumed in the present example that the reproduction terminal 26 can show the video files which have been uploaded to the server 25, and that the reproduction terminal 26 is currently reproducing a first video content item among the video files.

The server 25 includes a file reading unit 251, a data transfer unit 252, an angle switch unit 253, and the storage unit 24. The storage unit 24 is provided inside or outside the server 25.

The storage unit 24 is connected to the server 25. The storage unit 24 is, for example, a hard disk or the like. The storage unit 24 holds (stores), for example, a plurality of video content items (video files 1 to 3) uploaded by a large number of unspecified people.

The file reading unit 251 reads, from the storage unit 24, a video file (first video content item) designated by a file designation unit 262 in the reproduction terminal 26. According to the instructions from the angle switch unit 253, the file reading unit 251 reads, from the storage unit 24, a new video file (second video content item) instructed by the angle switch unit 253 to read.

The data transfer unit 252 has the function of the reproduction unit 23. The data transfer unit 252 transfers the video file (the first video content item or the second video content item) read by the file reading unit 251 to the reproduction terminal 26 via the network 301.

The angle switch unit 253 has the function of the selection unit 21 and the function of the determination unit 22.

More specifically, for example, when the angle switch unit 253 receives an instruction signal for instructing angle switching (hereinafter, referred to as an "angle switch instruction") from the instruction unit 261 in the reproduction terminal 26, the angle switch unit 253 searches for metadata of a video file stored in the storage unit 24 by using, as a key, metadata associated with a scene in the video file (first video content item) which has been read by the file reading unit 251 and transferred by the data transfer unit 252, and selects, from the storage unit 24, a video file (second video content item) associated with the metadata similar to the searched-out metadata.

The angle switch unit 253 instructs the file reading unit 251 to read the selected video file (second video content item) as a new video file (second video content item).

It should be noted that the angle switch unit 253 determines a reproduction start position of the target video content to be reproduced (second video content item) based on (a) the angle switch instruction issued from the instruction unit 261 and (b) a time stamp described in the metadata associated with the currently-reproducing video file (first video content item). In other words, the angle switch unit 253 instructs the file reading unit 251 to detect a reproduction start position of the selected second video content item, in other words, a position (time, scene) of the selected second video content item as corresponding to a position (time, scene) at which an angle switch instruction is received during the reproduction of the first video content item, and then read the second video content item from the detected position.

The reproduction terminal 26 is operated by an unspecified person to access the server 25 to watch video content items. The reproduction terminal 26 includes an instruction unit 261, a file designation unit 262, and a reproduction unit 23. The reproduction unit 23 includes a data receiving unit 231 and a decoding unit 232. It should be noted that the reproduction terminal 26 is connected to a display apparatus 27 that includes a display unit 271 and an input unit 272.

The file designation unit 262 receives instructions given from a predetermined person using the input unit 272, for example. According to the received instructions, the file designation unit 262 provides the file reading unit 251 with instructions that a video content item (first video content item) is designated among a plurality of video content items (video files 1 to 3) stored in the storage unit 24.

The instruction unit 261 receives an angle switch instruction inputted by the predetermined person using the input unit 272, for example. The instruction unit 261 provides the instruction to the angle switch unit 253.

The data receiving unit 231 and the decoding unit 232 have the function of the reproduction unit 23.

The data receiving unit 231 receives a video file (a first video content item or a second video content item) transferred from the server 25.

The decoding unit 232 decodes the video file received by the data receiving unit 231, and transmits, as video data, the decoded video file to the display apparatus 27. Here, it is also possible that the data transfer unit 252 transfers video files sequentially from respective reproduction start positions determined by the angle switch unit 253, then the decoding unit 232 sequentially decodes the video files received by the data receiving unit 231 and transmits the decoded video files to the display apparatus 27, and the video files are reproduced from the respective reproduction start positions determined by the angle switch unit 253. It is further possible that a time corresponding to a time instructed by the instruction unit 261 is determined as a reproduction start position, and a video file is decoded and transmitted as video data to the display apparatus 27.

The display apparatus 27 displays the video data transmitted from the reproduction unit 23, on a display unit such as a display.

It is still further possible that a Graphical User Interface (GUI) for searching out or designating video files is provided as the input unit 272 on a screen displayed by the display unit 271. It is still further possible that a GUI for an angle switch button by which a user (predetermined person) gives an angle switch instruction is provided as the input unit 272.

The content reproduction apparatus 20A, which includes the server 25 and the reproduction terminal 26 having the above-described respective structures, switches a first video content item to a second video content item to reproduce the plurality of accumulated video content items as a single multi-angle video.

It should be noted that it has been described in the present example that the server 25 and the reproduction terminal 26 are connected to each other via the network 301 to form a content reproduction apparatus 20A as a single system, but the present invention is not limited to the embodiment. For example, the server 25 and the reproduction terminal 26 may be integrated to a single apparatus.

Figure 11:
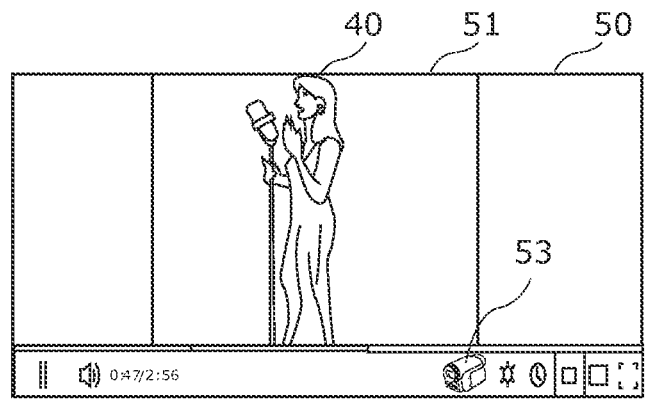
FIG. 11 is a diagram for explaining an example of an operation of the content reproduction apparatus according to Example 2.
Figure 12:
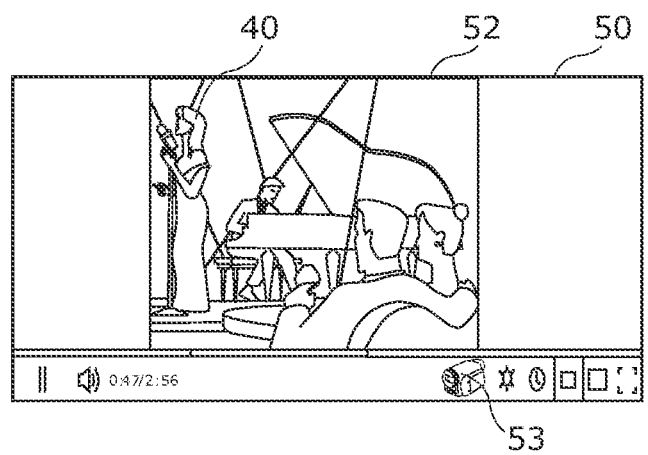
FIG. 12 is a diagram for explaining another example of the operation of the content reproduction apparatus according to Example 2.
Figure 13:
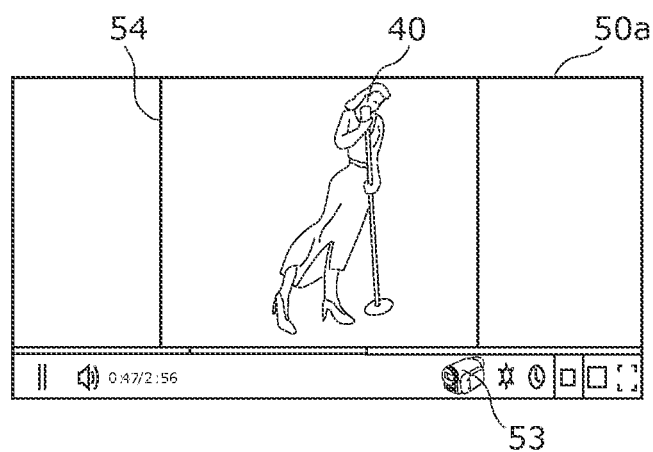
FIG. 13 is a diagram for explaining still another example of the operation of the content reproduction apparatus according to Example 2.

Next, the operation of the content reproduction apparatus 20A having the above-described structure is described with FIGS. 11 to 13. FIGS. 11 to 13 are diagrams for explaining examples of the operation of the content reproduction apparatus according to Example 2.

First, FIG. 11 shows the situation where a video content item (video file 1) captured by a camera 10a is uploaded to the server 25, and the uploaded video file 1 is watched on the reproduction terminal 26. Here, FIG. 11 shows an example where the video file V1 capturing a singer 40 is reproduced on a screen 51 of a display 50a. Furthermore, an angle switch button 53 is provided on a screen displayed on the display 50a.

Next, a user of the camera 10a clicks the angle switch button 53 to issue an angle switch instruction from the instruction unit 261 to the server 25. Thereby, in the server 25, the angle switch unit 253 reads metadata associated with a currently-reproducing scene in the video file 1. Then, the storage unit 24 is searched to find metadata describing a time stamp and spatial information (for example, latitude/longitude) which are similar to a time stamp and spatial information in the readout metadata. As a result, a video file 2 associated with the searched-out similar metadata is selected. Here, the video file 2 is associated with the metadata similar to the metadata of the video file 1. In other words, although the video file 2 has been generated by a user different from the user of the camera 10a, it is possible to expect that the video file 2 shows the same singer 40 as captured by the user of the camera 10a.

Next, the angle switch unit 253 instructs the file reading unit 251 to detect a reproduction start position of the selected video file 2, in other words, a scene corresponding to a position at which the angle switch instruction is received during the reproduction of the video file 1, and read the selected video file 2 from the detected reproduction start position. Then, the file reading unit 251 reads the video file 2, and the data transfer unit 252 transfers the video file 2 to the reproduction terminal 26. As described above, the server 25 transfers the video file 2 to the reproduction terminal 26.

Next, as shown in FIG. 12, it is possible to watch the video file 2 transferred from the server 25 on the reproduction terminal 26. Here, FIG. 12 shows an example where the video file V2 capturing the singer 40 from a different angle is reproduced on the screen 52 of the display 50a.

As described above, the user of the camera 10a can watch a video, which has been captured not by the user but by a stranger, in other words, a video captured from an angle different from an angle of a user's capturing video, continuously after the user's capturing video as if the video captured by the stranger was captured by the user.

Here, it is assumed that the angle switch button 53 shown in FIG. 12 is further clicked. Then, the above-described operation is performed, so that, for example, as shown in FIG. 13, the user can watch a video file 3 captured by still another stranger on the reproduction terminal 26. Here, FIG. 13 shows an example where the video file 3 capturing the singer 40 from a further different angle is reproduced on a screen 54 of the display 50a.

Conventionally, a user of a camera can watch only videos captured by the user's camera from a fixed angle. However, according to the present example, the user can connect a video captured by the user to a different video captured by a stranger using a different camera from a different angle. Therefore, the present embodiment can allow the user to watch the videos captured from various angles. Furthermore, the present embodiment can allow not only users having captured respective videos but also viewers not having captured the videos to watch the videos from various angles.

It should be noted that it has been described that the videos captured from various angles are generated by strangers, but such videos may be captured by, of course, acquaintances such as family and friends. In this case, it is not necessary to edit the video files generated by a plurality of cameras by cutting the video files to be a single video.

It should be note that it has been described in the present example that a viewer presses the angle switch button 53 provided on the display screen to issue an angle switch instruction, but the present invention is not limited to the above method. It is also possible that the content reproduction apparatus or the content reproduction system automatically performs the angle switching at random, for each predetermined time interval, or depending on a change of videos.

Furthermore, the following case is also possible. The server 25 stores pieces of metadata each describing a capturing date and time, a capturing place, a capturing direction, and the like. The server 25 presents, to the user, video content items having a high relevancy in a list, or in association with one another, to be reproduced. For example, video content items capturing the same event (having the same capturing date, time, and place), captured at the same time (videos captured at the same time at different places), or captured at the same place (videos captured at the same place but at different times) are considered as having a high relevancy. The operation in this case is described below.

Figure 14:
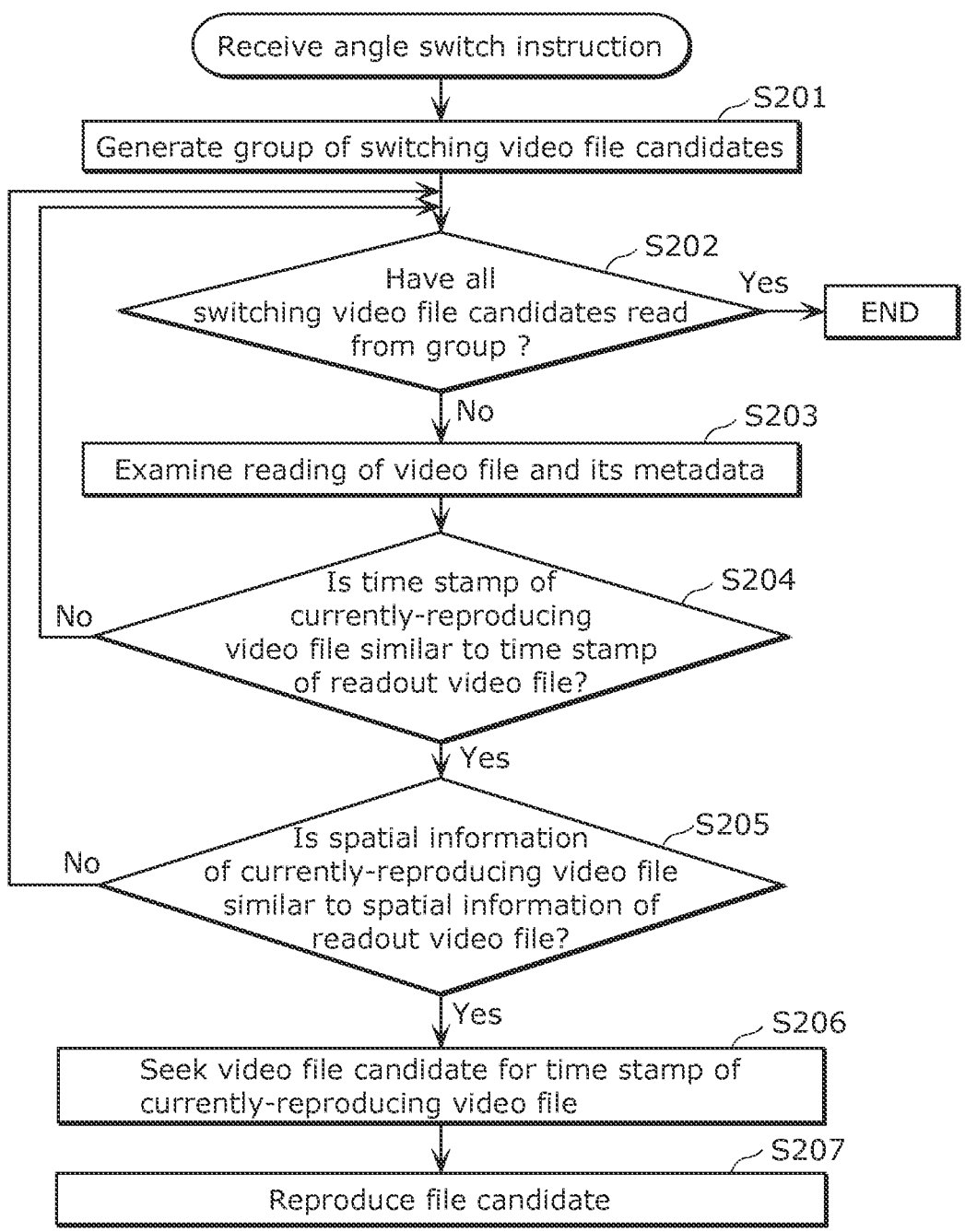
FIG. 14 is a flowchart for explaining an operation of a server according to Example 2.

FIG. 14 is a flowchart for explaining an operation of the server according to Example 2.

First, the angle switch unit 253 is assumed to receive an instruction signal indicating an angle switch instruction.

Then, the angle switch unit 253 generates a group of video file candidates to be switched (hereinafter, referred to as "switching video file candidates") (S201).

Here, the angle switch unit 253 may examine pieces of metadata associated with all the video files (video content items) stored in the storage unit 24, at the first time when the instruction signal is received, but such examination consumes an immense amount of time and is not practical. Therefore, the angle switch unit 253 may previously narrow down video files having a possibility of being switched next.

It is further possible that the angle switch unit 253 starts narrowing down candidates (video files having a possibility of being switched next) from when an instruction signal indicating an angle switch instruction is received. It is, for example, still further possible that the angle switch unit 253 always narrows down candidates regardless of whether an instruction signal indicating an angle switch instruction (viewer's clicking of a button) is received. It should be noted that, when no candidate is found, the angle switch instruction is not effective. It is therefore possible that, when no candidate is found, the angle switch button provided on the display screen is not displayed, or is displayed as not clickable (for example, displayed as grey). On the other hand, if at least one candidate is found, the angle switch instruction is effective. In this case, in order to allow the user to easily check a video content item to be reproduced in each of the candidates, it is possible to display the video content item in "Picture in Picture" style or on a separate screen.

It should be noted that there are various methods for narrowing down video files. For example, video files are narrowed down according to titles of video files, or date and time of uploading the video files. Furthermore, it is also possible that, when uploading a video file, metadata associated with the video file is read out and recorded on a previously-generated database, and such recorded pieces of metadata are used to narrow down video files.

Next, the file reading unit 251 sequentially reads the switching video file candidates from the group generated at S201. Here, the angle switch unit 253 checks whether or not the file reading unit 251 has retrieved all the switching video file candidates (S202).

If the file reading unit 251 has retrieved all the candidates (Yes at S202), the server 25 is not capable of switching an angle and therefore the processing is terminated.

Otherwise, in other words, if there is still a switching video file candidate which has not been examined in the group (a video file which has not yet been read out) (No at S202), then the file reading unit 251 reads the video file and the angle switch unit 253 examines pieces of metadata assigned to respective scenes included in the video file (S203).

Next, the angle switch unit 253 examines whether a time stamp described in metadata assigned to a currently-reproducing scene of a current video file is similar to a time stamp associated with the video file read by the file reading unit 251 (S204). Here, if it is determined that these time stamps are not similar (No at S204), then the processing returns to S202 to read another candidate (video file).

It should be noted that, at S204, if a similarity between these time stamps is high, it is possible to perform angle switching more seamlessly, but a difference between the time stamps may be accepted to some extent. In this case, if these time stamps have a similarity with an acceptable difference (Yes at S204), then the processing proceeds to S205. On the other hand, if these time stamps have a similarity with an unacceptable difference (No at S204), then the processing returns to S202.

If a difference of between time stamps (in other words, low similarity) is allowed to some extent, it is preferable that a difference of a time stamp indicating the "past" of the time stamp of the currently-reproducing scene is less acceptable than a difference of a time stamp indicating the "future" of the time stamp of the currently-reproducing scene. This prevents that a viewer feels uncomfortable watching a "past" scene after angle switching. The acceptable range of the difference may be determined based on whether or not the difference exceeds a predetermined threshold value, or comprehensively determined based further on a difference of spatial information described below without using the threshold value. For example, it is also possible that, if a difference of a time stamp is large but a difference of spatial information is small, a target video content item is determined as a switching video file candidate.

Furthermore, the threshold value may not be fixed but may be variable. For example, if details reproduced by a video the are a lecture, a play, a musical performance, or the like, a temporal inconsistency between scenes before and after angle switching results in crucial "jumpiness". On the other hand, if details reproduced by a video file are cheers of sports audience or the like, such a temporal inconsistency is not crucial to some extent. In other words, a threshold value for a difference between time stamps may be dynamically changed depending on a genre of details reproduced by a video file. The selection of a genre may be determined based on viewer's designation, a title or a tag of a video file, analysis of audio information, or analysis of image information.

At S204, if it is determined that the time stamps are similar (Yes at S204), then the processing proceeds to S205.

Next, the angle switch unit 253 examines whether or not a piece of spatial information described in metadata assigned (associated) to the currently-reproducing scene of the current video file and a piece of spatial information associated with the video file read by the file reading unit 251 are similar (S205).

More specifically, if the angle switch unit 253 has found a video file having a time stamp with an acceptable difference from the time stamp of the currently-reproducing scene, then the angle switch unit 253 examines not only the time stamp but also the spatial information described in the metadata to determine a similarity to the time stamp and the spatial information of the currently-reproducing scene.

Here, as described above, a piece of spatial information includes, for example, parameters of position information of a capturing camera, such as latitude/longitude, an orientation of the capturing camera (angle of the camera), an altitude of the capturing camera, and the like. The similarity between pieces of spatial information is determined by comprehensively evaluating these parameters.

In the present embodiment, angle switching is performed between video files capturing the same subject from different angles, so that evaluation of a similarity of spatial information is performed within an acceptable range to some extent. This is because, a currently-reproducing video file and a video file candidate are not considered as showing the same subject unless the video files share the same camera position and the same camera orientation (angle) to some extent. However, if the camera positions and the camera orientations (angles) are too much similar between the video files, the angle switching cannot provide its effects of changing an angle (effects of inserting a different video captured by a different camera from a different angle) because the angle of the video file candidate is almost the same as the angle of the currently-reproducing video file.

The evaluation for position information and an orientation (angle) of a camera will be described in detail in Example 3, so that the evaluation is not explained herein. If a similarity of position information between cameras is evaluated high when the similarity is large within a range defined by a threshold value, such as a several hundreds of meters, the angle switch effects are increased. It should be note that an altitude of a camera is useful in determining which event has been captured among events on different floors of the same building at the same time. For example, if a few couples have wedding ceremonies on different floors of the same building, an altitude of a camera is useful to determine which wedding ceremony is captured by the camera among a plurality of video files capturing respective wedding ceremonies. This is because it is possible to perform angle switching among video files having the same altitude.

Next, at S205, if it is determined that these pieces of spatial information are not similar (No at S205), then the processing returns to S202 to read a different candidate (video file candidate).

On the other hand, if it is determined that these pieces of spatial information are similar (Yes at S205), then the server 25 reads the candidate (the video file read by the file reading unit 251), and seeks a position of the corresponding time stamp (S206), and then reproduces the candidate from the position (S207).

More specifically, if the angle switch unit 253 confirms that these pieces of spatial information are similar (Yes at S205), then according to the instructions from the angle switch unit 253, the file reading unit 251 reads the candidate (video file), and seeks a position of the corresponding time stamp (reproduction start position) (S206). Then, the data transfer unit 252 transfers the candidate read by the file reading unit 251 to the reproduction terminal 26 via the network 301 (S207).

It should be noted that, when the above-described similarity between time stamps or between pieces of spatial information is evaluated, the evaluation may be conducted based also on a reliability of each parameter (time stamp or spatial information). For example, it is possible that, even if a currently-reproducing video file and a video file candidate have a high similarity in position information of the cameras, when a reliability of the position information of the cameras is low, pieces of spatial information of these video files are not evaluated as similar but and another candidate (video file) is selected. It should be note that the above-described similarity is calculated based on a reliability (so that the similarity is lower if the reliability is lower), and only the similarity is evaluated.

It should be noted that it has been described with reference to FIG. 14 that each of video files included in a switching video file candidate group is evaluated, and as soon as a video file (candidate) associated with metadata describing similar time stamp and spatial information is found, angle switching is performed to display the found video file. However, the present invention is not limited to the above. For example, it is also possible that all the video files (candidates) included in the switching video file candidate group are evaluated to find a video file (candidate) having the highest evaluation value. It is further possible that a history of angle switching is stored and a video file that has been used for angle switching is evaluated low. In this case, it is possible to select more video files.

Example 3

In Example 3 according to Embodiment 1, another evaluation method of evaluating spatial information described at S205 in FIG. 14.

Figure 15:
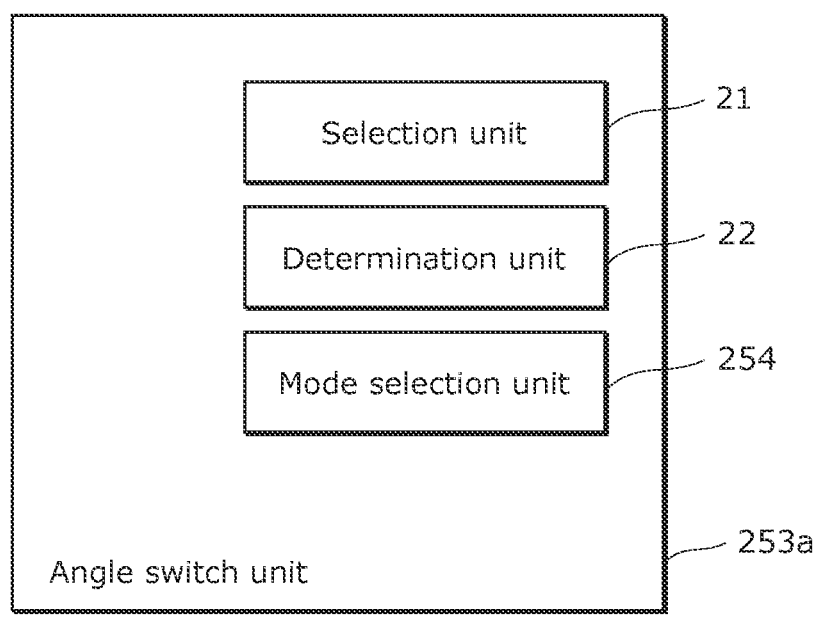
FIG. 15 is a diagram showing an example of a structure of an angle switch unit according to Example 3.

FIG. 15 is a diagram showing an example of a structure of an angle switching unit according to Example 3. It should be noted that the same reference numerals in FIGS. 9 and 10 are assigned to the identical elements in FIG. 15, so that they are not described in detail again below.

As mentioned also in Example 2, an evaluation method of evaluating, in particular, position information and an orientation (angle) of a camera may be changed depending on a subject captured by the camera, details (genre) reproduced by a video file, or the like.

In the present example, the evaluation method is assumed to be changed according to three evaluation modes; a "theater mode", a "stadium mode", and a "party mode". Here, the theater mode is an evaluation mode for situations, such as lectures, plays, and musical performance, where cameras film a subject from the same direction. The stadium mode is an evaluation mode for situations, such as watching sports festivals, baseball games, and soccer games, where cameras surround a subject to be captured. The party mode is an evaluation mode for situations, such as banquets and parties, where there are subjects in various directions.

The angle switch unit 253a shown in FIG. 15 differs from the angle switch unit 253 in further including a mode selection unit 254.

The mode selection unit 254 receives instructions (hereinafter, referred to as a "selection instruction") from a person such as a viewer or a user to select a certain evaluation mode, and determines whether or not metadata (in particular, spatial information) is evaluated in the instructed evaluation mode.

For example, it is possible that three kinds of the angle switch button 53 as shown in FIGS. 11 to 13 are prepared for the above-described respective three evaluation modes, and a viewer clicks one of the buttons to select (designate) a mode for angle switching, for example, the "theater mode" or the "stadium mode" for angle switching. This is an example, and it is also possible that the system automatically selects the evaluation mode. In this case, the system may select the evaluation mode based on a title or a tag of the video file, based on analysis on audio information, or based on analysis on image information.

Figure 16:
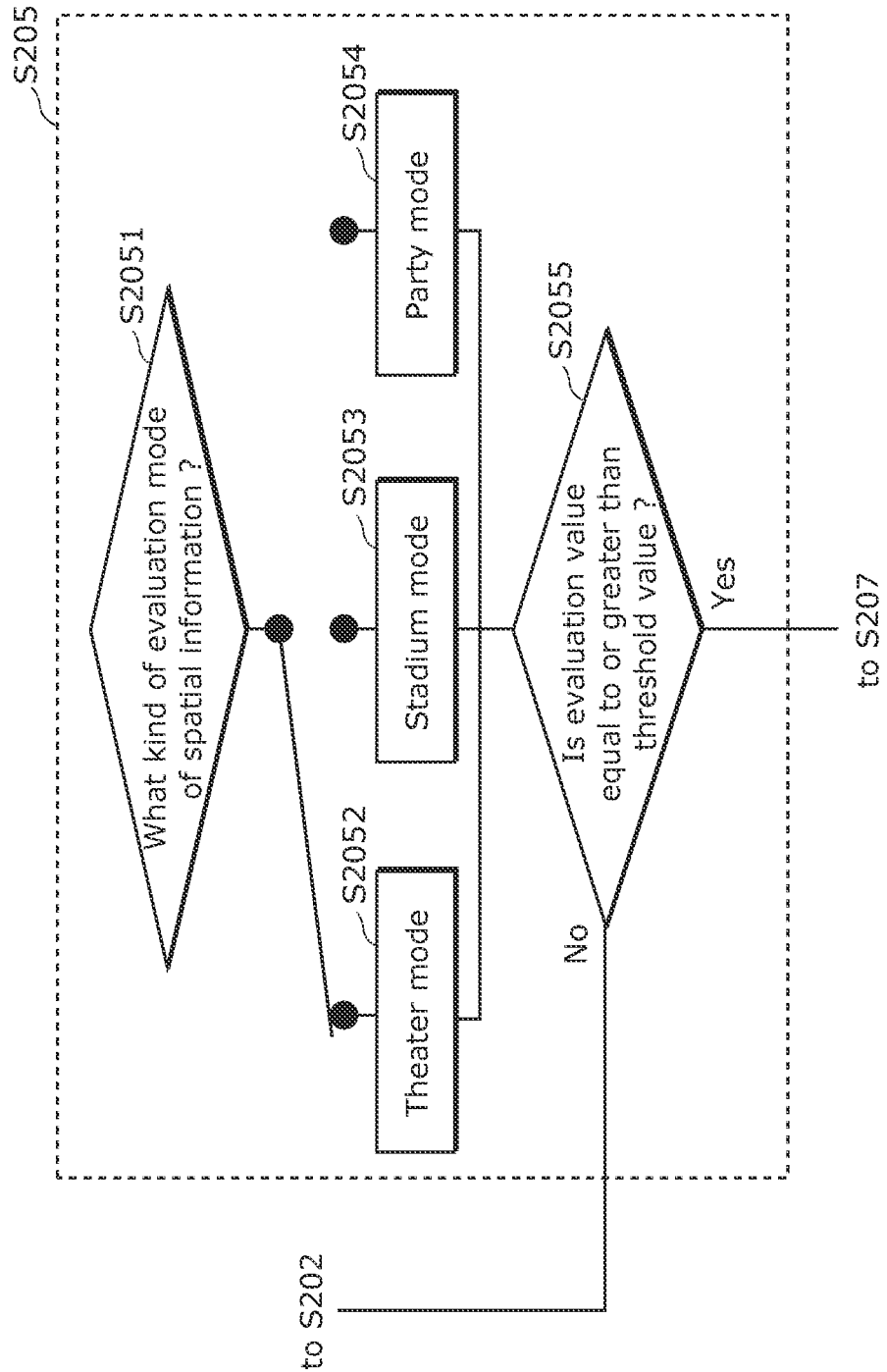
FIG. 16 is a diagram showing S205 in detail according to Example 3.

FIG. 16 is a diagram showing S205 in detail according to Example 3. It should be noted that the same reference numerals in FIG. 14 are assigned to the identical elements in FIG. 16, so that they are not described again below.

At S205, the angle switch unit 253a examines whether or not spatial information described in metadata assigned to a currently-reproducing scene in a current video file and spatial information associated with a video file read by the file reading unit 251 are similar.

In the present example, as shown in FIG. 16, first, the angle switch unit 253a examines the evaluation mode selected by the mode selection unit 254 (S2051).

Next, when the selected evaluation mode is the theater mode (S2052), the stadium mode (S2053), or the party mode (S2054), the angle switch unit 253a examines whether an evaluation value of spatial information set according to the selected evaluation mode is equal to or greater than a threshold value (S2055). More specifically, the angle switch unit 253a examines whether or not an evaluation value, which is used for evaluating whether or not spatial information associated with a video file read by the file reading unit 251 is similar to spatial information described in metadata assigned to a currently-reproducing scene in a current video file, is equal to or greater than the threshold value.

If the evaluation value is equal to or greater than the threshold value (Yes at S2055), then the angle switch unit 253a proceeds to S207. Otherwise (No at S2055), the angle switch unit 253a returns to S202.

Here, the evaluation method of evaluating spatial information according to the evaluation mode is described in more detail.

Figure 17:
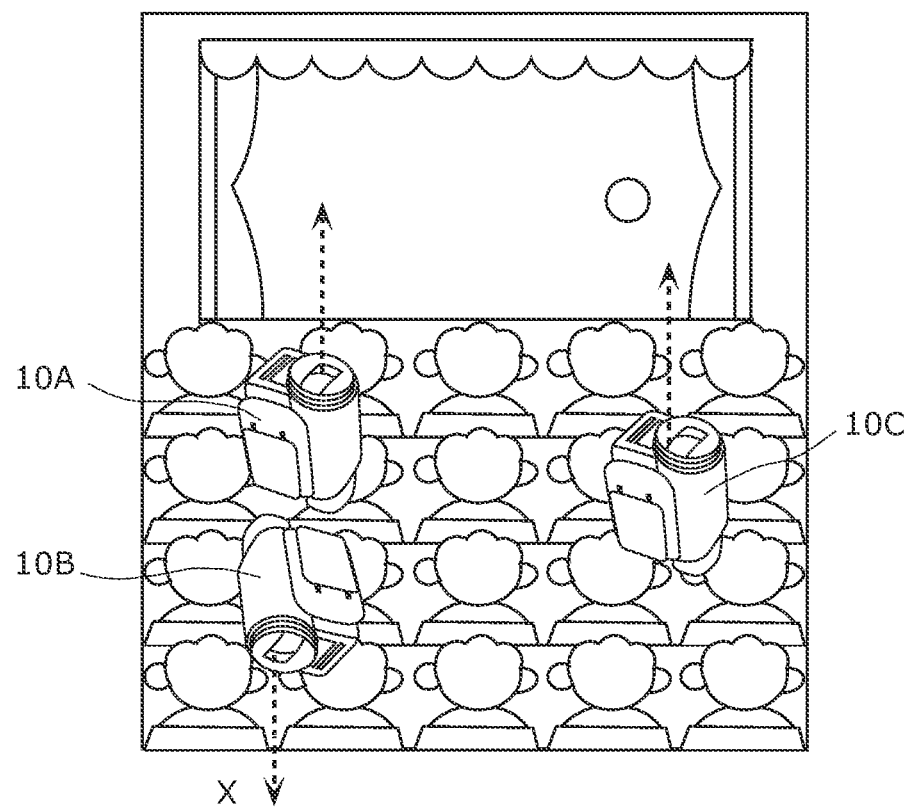
FIG. 17 is a diagram for explaining an evaluation method of evaluating position information and orientations of cameras in theater mode.

FIG. 17 is a diagram for explaining an evaluation method of evaluating position information and orientations of cameras in the theater mode. In FIG. 17, it is assumed that a video file, which has captured a subject, such as a lecture, a play, or music performance, by a cameras 10A from one direction, is currently reproduced (watched). In the figure, a video file generated by a camera 10B and a video file generated by a camera 10C are shown as video file candidates available for angle switching.

A position (position information) of the camera 10B is closer to a position (position information) of the camera 10A than a position (position information) of the camera 10C. However, an angle (orientation) of the camera 10B is opposite to an angle (orientation) of the camera 10A. Therefore, an evaluation value of spatial information of the video file generated by the camera 10B is lower than that of the video file generated by the camera 10A. This is because, in the theater mode, under the assumption that a subject is captured from the same direction, the video file generated by the camera 10B has a lower possibility of recording the desired same subject and is therefore not expected to offer effects of angle switching.

On the other hand, although the position of the camera 10C is far from the position of the camera 10A, an angle of the camera 10C is the same as the angle of the camera 10A. Therefore, spatial information of the video file generated by the camera C is evaluated high. In the theater mode, pieces of spatial information are evaluated as described above.

Figure 18:
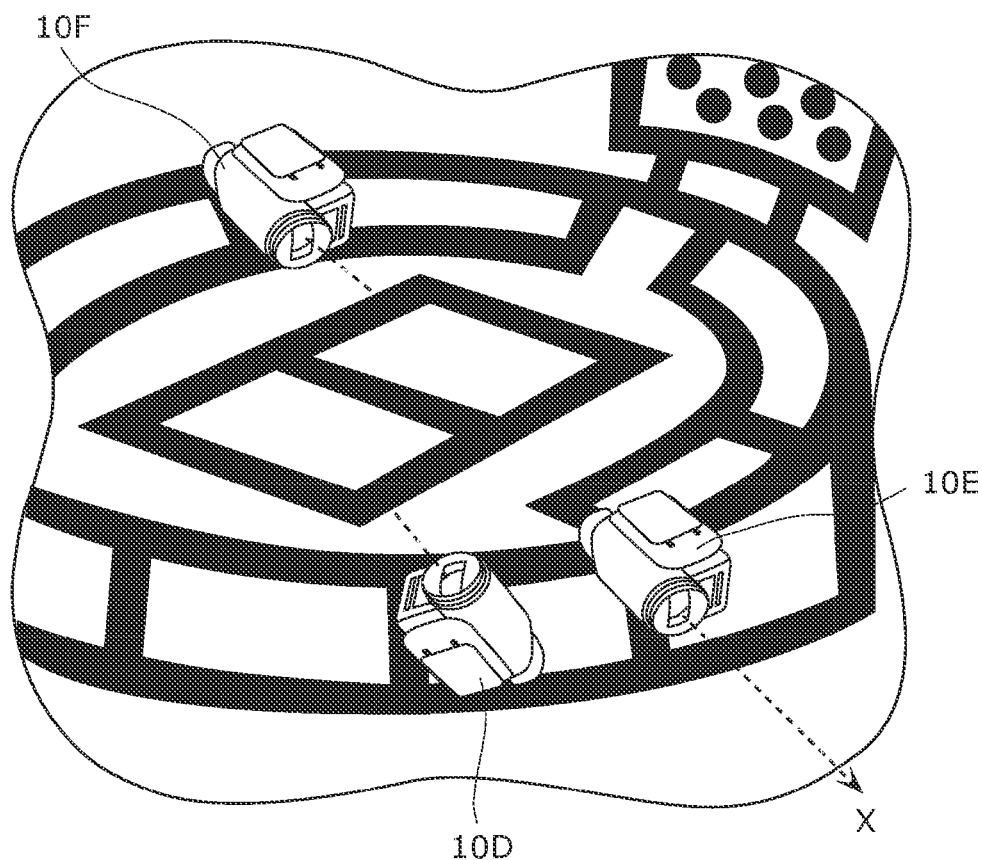
FIG. 18 is a diagram for explaining an evaluation method of evaluating position information and orientations of cameras in stadium mode.

FIG. 18 is a diagram for explaining an evaluation method of evaluating position information and orientations of cameras in the stadium mode. In FIG. 18, it is assumed that a video file (video), which has captured a subject, such as a sports festival, a baseball game, or a soccer game, by a camera 10D among cameras surrounding the subject, is currently reproduced (watched). In this figure, a video file generated by a camera 10E and a video file generated by a camera 10F are shown as video file candidates available for angle switching.

A position (position information) of the camera 10E is closer to a position (position information) of the camera 10D than a position (position information) of the camera 10F. However, an angle (orientation) of the camera 10E is opposite to an orientation of the camera 10D. Therefore, an evaluation value of spatial information of the camera 10E is low. The reason is the same as described for the situation in the theater mode, and therefore not explained again.

On the other hand, although an angle (orientation) of the camera 10F is also opposite to the angle (orientation) of the camera 10D in the same manner as the camera 10E, the camera 10F has a high evaluation value. This is because the position of the camera 10F is in the orientation of the camera 10D and has a distance from the position of the camera 10D, so that the camera 10F has a high possibility of capturing the same subject as captured by the camera 10D from a different angle in a stadium. As described above, in the stadium mode, pieces of spatial information are evaluated by the evaluation method different from the evaluation method used in the theater mode.

Figure 19:
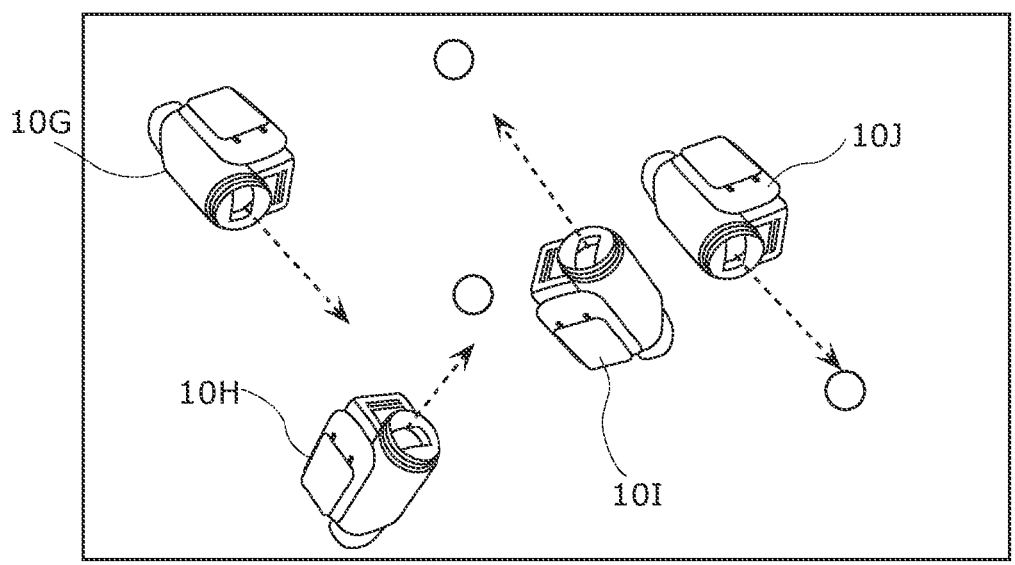
FIG. 19 is a diagram for explaining an evaluation method of evaluating position information and orientations of cameras in party mode.

FIG. 19 is a diagram for explaining an evaluation method of evaluating position information and orientations of cameras in the party mode.

In FIG. 19, it is assumed that a video file (video) captured by the camera 10G in the situation where subjects are in various directions in a banquet, a party, or the like is currently reproduced (watched). In this figure, video files generated by cameras 10H, 10I, and 10J are shown as video file candidates available for angle switching.

It should be noted that, in the party mode, there are subjects in various directions, so that any video files (videos) generated by the cameras 10H to 10J may be targets for angle switching.

It should be noted that the method of selecting a target video file for angle switching is not limited to the above method. For example, it is also possible that a screen showing an evaluation mode and a screen showing cameras are displayed as sub-screens on a part of the screen on which a video file is currently reproduced, and a user (viewer) selects a desired one of the cameras so that a video file associated with the selected camera is reproduced from a position (scene, time) corresponding to a time of selecting the video file. In this case, for example, as shown in FIGS. 17 to 19, cameras are displayed on an image simulating a theatre, an image simulating a stadium, or an image simulating a party room, based on respective pieces of spatial information and time stamps. If each camera is displayed to be associated with a video file selected based on a time stamp and spatial information and to correspond to the spatial information, the user can intuitively select a desired video file from video files selected by the server 25.

Embodiment 2

Although it has been described in Example 3 according to Embodiment 1 that a plurality of evaluation methods (evaluation modes) for evaluating spatial information are prepared, and angle switching (selection of video content item(s)) is performed based on an evaluation method selected from the evaluation methods, the present invention is not limited to the above-described method. For example, it is possible to select a video content item according to a subject captured in the video content item in addition to the spatial information. The present embodiment describes the above case.

Figure 20:
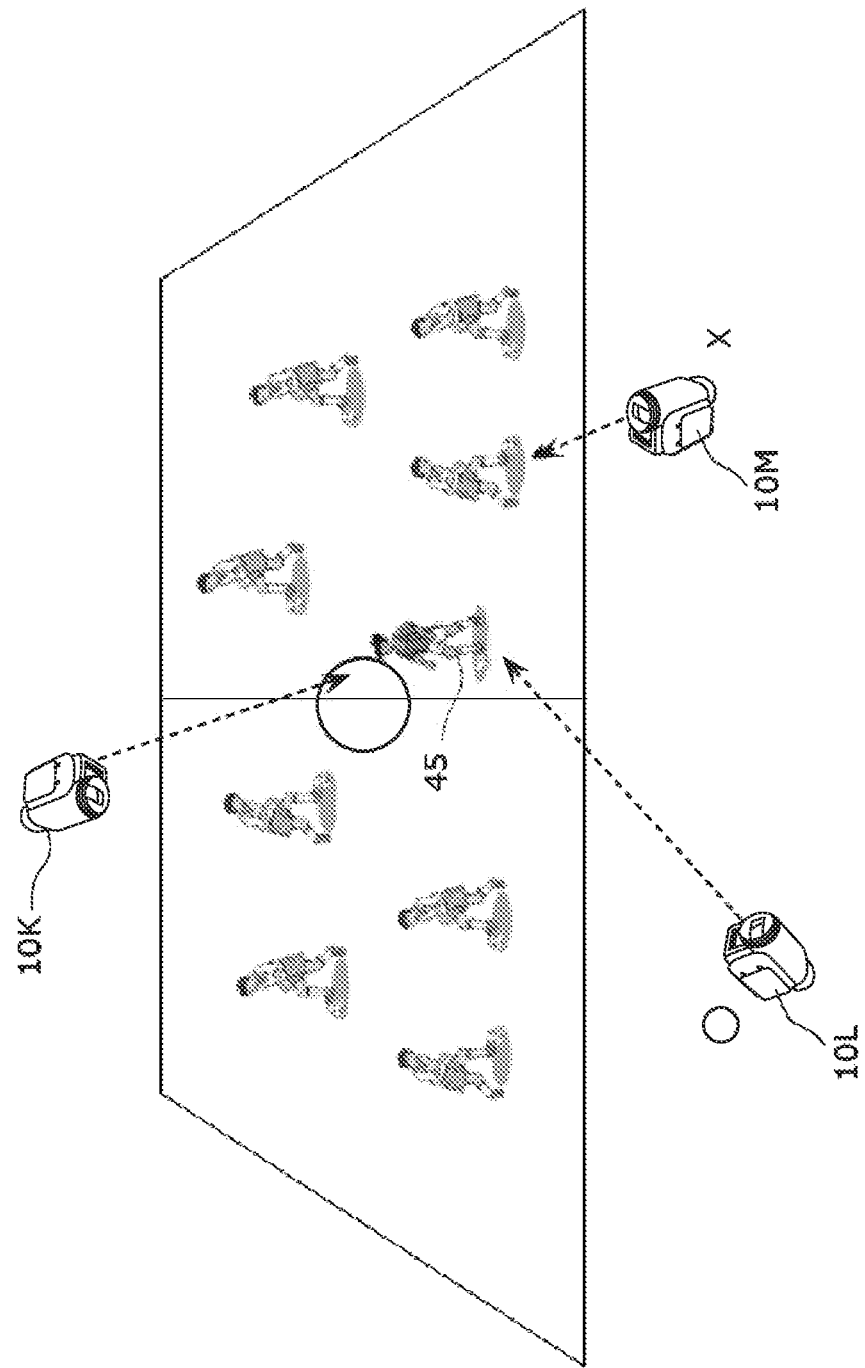
FIG. 20 is a diagram for explaining an evaluation method of evaluating position information and orientations of cameras according to Embodiment 2.

FIG. 20 is a diagram for explaining an evaluation method of evaluating position information and orientations of cameras according to Embodiment 2.

In FIG. 20, among video files capturing a soccer game by a plurality of cameras 10K to 10M, a video file generated by the camera 10K is currently reproduced (watched). Here, it is assumed that the camera 10K is reproducing a video file (video) capturing a player 45. It is also assumed that the "stadium mode" is selected as an evaluation mode.

In this case, if an angle switch instruction is given, according to the above-described evaluation method of evaluating spatial information in the stadium mode, pieces of spatial information of the video files generated by the cameras 10L and 10M have high evaluation values as video files switchable from the currently-reproducing video file generated by the camera 10K.

In the present embodiment, on the other hand, a video file is switched to another according to not only spatial information but also the subject captured in the video file.

More specifically, the player 45 is extracted as the subject captured by the camera 10K, and a video file capturing the player 45 is selected. More specifically, in comparing between the cameras 10L and 10M which have high evaluation values of spatial information, while the video file generated by the camera 10L captures the player 45, the video file generated by the camera 10M does not capture the player 45. Therefore, the video file generated by the camera 10L is selected as a video file to be switched from the currently-reproducing video file generated by the camera 10K.

As described above, in the present embodiment, switching of a video file (selection of video content item(s)) is based on not only spatial information but also a subject captured in the video file. This offers advantageous effects to, for example, a user who wishes to keep watching a favorite player from various angles, or parents who wish to watch a child in a sports game captured by a plurality of cameras.

It should be noted that the operation in the stadium mode which has been described in the present embodiment is a mere example. The same advantageous effects can also be offered, for example, in the theatre mode, when a user wishes to keep watching, from various angles, a favorite singer among singers in the same show.

It should be noted that, as the method of determining the same subject captured in a video file, if the subject is a person, it is possible to identify the person by using a face detecting technology, and if the subject is in a soccer game or the like, it is possible to detect a uniform number to identify the subject. Furthermore, if correct position information and a correct orientation (angle, direction) of a camera used in capturing is recorded as spatial information, it is possible, for example, to determine position coordinates of a subject (player 45) currently displayed in the video generated by the camera 10K shown in FIG. 20. Therefore, it is possible to select a camera (camera 10L in the example of FIG. 20) capturing a subject at the same position coordinates. The above techniques may be combined. For example, it is also possible that, if a face image can be recognized, a subject is specified by face image detection, and if a face is not shown, the subject is specified by a uniform number, and if none of the face image nor the uniform number are displayed, the position coordinates of the subject are determined.

It is also possible that, in the method of switching angle (selection of video content item(s)) depending on a subject, a user previously resisters a subject to be pursued into the system prior to reproducing. It is also possible to pursue a subject shown at the center of the screen when an angle switch instruction is given during reproduction, or to use a use history of a user in a different system. For example, it is assumed that there is a history that the user has purchased an autobiography of a player 45 over the Internet. Since the user is probably a fan of the player 45, it is possible to detect a face image of the player 45 and select a mode for automatically pursuing the player 45. It is also possible to resister still picture data of a subject into the system to identify the subject. In this case, the system detects the face image of the subject from the registered still picture data, thereby searches for video data including similar face image, and then reproduces the searched-out video data.

It should be noted that the face image detection may be performed for each selection of a video file. It is further possible that the face image detection is previously performed, and a database is created to associate a detected person with video data and scenes capturing the person, so that the database is searched to select the video data capturing the same subject.

As described above, it is possible to provide the content reproduction method, the content reproduction system, and the content imaging device all of which are capable of selecting and reproducing related video content items even if the related video contents are generated by strangers.

Thereby, the present invention can be applied to editing for automatically cutting a video content item. The user can select a video content item generated by someone and display the video content item as if the video content item was generated by the user. This offers, for example, a variety of enjoyments in watching video content items on the Internet.

The present invention can also simplify television broadcasting. For example, when a concert of a some singer is to be broadcast, content imaging devices according to the present invention, such as movie cameras, are lent to audience in a concert site. The audience captures the concert as they like as volunteers. The captured videos are not accumulated in the respective movie cameras, but uploaded to a server (content reproduction apparatus) on the Internet. Then, viewers are charged by accesses to the server (content reproduction apparatus) so as to watch the video content items captured by the audience from various angles. As described above, in comparison to the conventional broadcasting, it is not necessary to hire cameramen or a switcher for editing the video content items by cutting. Furthermore, the viewers can select videos captured from preferred angles and keep watching the selected videos. The advantageous effects are impossible in the conventional broadcasting.

It should be noted in each of the above embodiments that each of the constituent elements may be implemented to a dedicated hardware, or may be implemented by executing a software program suitable for a corresponding one of the constituent elements. Each of the constituent elements may be implemented by a program execution unit, such as a CPU or a processor, reads a software program recorded on a recording medium, such as a hard disk or a semiconductor memory, and executes the readout software program.

The above has been described for one or more embodiments of the content reproduction method, the content reproduction system, and the content imaging device according to the present invention. However, the present invention is not limited to the embodiments. Those skilled in the art will be readily appreciated that various modifications and combinations of the constituent elements in the embodiments are possible without materially departing from the novel teachings and advantages of the present invention. Accordingly, all such modifications and combinations are intended to be included within the scope of the present invention.

(Variations)

Although the main object of the above embodiments has been described as selection of video content items (videos) capturing the same subject from different angles, the present invention is not limited to the method.

For example, it is assumed that a user is watching a video (video content item) capturing a countdown scene in a New Year eve in Tokyo. Here, the case where the video is switched to a video capturing a countdown scene in the New Year eve in Osaka is also included in the scope of the present embodiment. More specifically, regarding pieces of position information of cameras capturing video content items to be compared to each other, it is not necessary to appropriate physical coordinates of the compared video content items. However, as position information of latitude and longitude is closer to a busy street in each city, the position information may be evaluated high for similarity evaluation of positional information. Of course, the above evaluation method can be used to switch the currently-reproducing video to a video capturing a countdown scene in the New Year eve abroad, such as Paris. In this case, regarding time stamps associated with the compared video content items, position information may be evaluated based not on an absolute simultaneity but on time stamps indicating "New Year eve" for respective countries. Of course, it is also possible to evaluate position information based on the absolute simultaneity by using the time stamps associated with the compared video content items. The above case can offer interesting advantages, for example, that the user can learn it is the evening one day before the New Year eve in Paris when it is the New Year eve in Tokyo.

As position information of a camera, it is possible to use not only physical coordinates such as latitude/longitude but also abstract position information such as a "hot place" or a "cold place". For example, it is assumed that, when the user is watching a video informing intensely hot weather, the user is interested in "how is in a cold location at the same time". In order to satisfy the user's interest, it is more efficient to use temperature information of a space including a capturing camera, rather than physical position information. In the same manner, it is also possible to use humidity information such as a "dry place" or a "wet place". Furthermore, as spatial information regarding a capturing camera, audio information inputted to a microphone of the capturing camera can be used. For example, spatial information such as a "noisy place" or a "quiet place" can be determined by using audio information provided from a microphone, so that a video of a busy street can be inserted with a video of a countryside captured at the same time.

Moreover, position information obtained from standard radio waves for determining western Japan, eastern Japan, or the like can be used as spatial information, although such position information is not precise. In this case, when the user is watching a video of somewhere in western Japan, the user can switch a current video content item to a video content item that satisfies the user's interest in "how is eastern Japan at the same time".

Furthermore, the spatial information may include a zoom value or an F value of a capturing camera. Such spatial information can allow selection of a plurality of video content items capturing the same subject from the same angle. As a result, it is possible to reproduce not only video content items switched for different angles, but also video content items switched for different zooms.

Furthermore, it has been described in the above-described embodiments that a video content item is selected based on a simultaneity of time stamps, but the present invention is not limited to the embodiments. For example, when the user is watching a video capturing a countdown scene in a New Year eve in Tokyo, the user may switch the currently-watching video to a video capturing the evening of a New Year's day, which is one day after the New Year eve, in Tokyo based on time stamps. Furthermore, it is also possible to switch to a video of a New Year eve one year before based on time stamps. As described above, a video may be selected based not on time stamps having a simultaneity, but on time stamps indicating different times.

It should be noted that the selection of a video content item has been described in the above-described present embodiments, the present invention is not limited to the above and it is also possible to select a still picture content item such as sill picture data in the same manner as described above. For example, if the angle switch button provided on the display screen is pressed during reproduction of a certain video content item, it is possible to switch the video content item to a still picture content item photographed in the same place on the same date, without switching to a different video content item. Here, the switching to the still picture content item is not limited to once. It is possible to perform slide show display by sequentially switching still picture content items captured at the same place on the same date, or by sequentially, in time order, switching still picture content items captured at the same place on the same date.

As described above, if a still picture content item is associated with metadata describing the above-described spatial information and time stamp, it is possible to select not only video content items but also such still picture content items.

In addition, when a user is reading a page describing in an HTML language on the Internet browser or the like, it is possible to associate the page with metadata describing a capturing data/time and a capturing place as additional information in the HTML page, so that the metadata allows the user to search the Internet for relevant still pictures or videos to be watched. Thereby, the metadata can be used at steps S204 and S205 in FIG. 14.

Furthermore, metadata may describe not only a capturing date/time and a capturing place, but also a name of an object shown in a still picture or video (personal name, building name, place name, or the like). Or, metadata may describe details of a video or a keyword of the details. For example, if metadata describes a personal name, a result of face recognition for determining the personal name may be managed in a server or the like. In this case, for example, it is possible that, when a user is reading a some electronic document and finds an interesting personal name, the user searches for the person by the personal name so as to display a video content item or a still picture content item showing a face image of the person having the person name.

If metadata describes details or a keyword, for example, metadata, which is associated with a video capturing release of a new three-dimensional product by AB company, may describe two keywords of "AB company" and "3D". Thereby, the metadata enables search for videos related to the "AB company" and videos related to "3D", and presentation to the user with relevant videos based on meanings of the videos not based on time or places.

Moreover, if metadata associated with (assigned to) a still picture content item and/or a video content item is used as a search keyword on a web, it is possible to present text information related to the content item. Thereby, for example, during/after watching a video capturing release of a new 3D product by AB company, a link button to a news article (text information) regarding the release can be superimposed as an application of the present invention.

The present invention can be applied to content reproduction methods, content reproduction systems, and content imaging devices, and in particular, to selection and reproduction of still pictures or videos in movie cameras, servers on the Internet, devices for simple television broadcast, and the like.

REFERENCE SIGNS LIST 10 content imaging device
10A, 10B, 10C, 10D, 10E, 10F, 10G, 10H, 10I, 10J, 10K, 10L, 10M, 10a, 10b, 10c camera
11 imaging unit
12, 24 storage unit
20 content reproduction apparatus
20A content reproduction apparatus
21 selection unit
22 determination unit
23 reproduction unit
25 server
26 reproduction terminal
27 display apparatus
30, 301 network
40 singer
45 player
50, 50a display
51, 51a, 51e, 52, 54 screen
53 angle switch button
112 optical unit
113 CMOS sensor
120 coding unit
121 GPS signal receiving unit
122 geomagnetic sensor
123 air pressure sensor
124 time stamp
125 spatial information
126 metadata generation unit
127 MUX
128 storage device
231 data receiving unit
232 decoding unit
251 file reading unit
252 data transfer unit
253, 253a angle switch unit
254 mode selection unit
261 instruction unit
262 file designation unit
271 display unit
272 input unit

The invention claimed is:

1. A content reproduction method of selecting at least one video content item from a plurality of video content items captured by a plurality of cameras and reproducing the selected at least one video content item,
   each of the video content items being associated with metadata that describes (a) a time stamp indicating a capturing time and (b) spatial information indicating features of space relating to a corresponding one of the cameras at the capturing time,
   the content reproduction method comprising:
   selecting at least one target video content item to be reproduced from among the video content items based on the time stamp and the spatial information described in each of pieces of metadata including the metadata, the pieces of the metadata being associated with a corresponding one of the video content items;
   determining a reproduction start position of the at least one target video content item based on the time stamp described in the metadata associated with the at least one target video content item; and
   reproducing the at least one target video content item from the reproduction start position,
   wherein, when at least one first video content item among the video content items has already been reproduced,
   in the selecting of the at least one target video content item, at least one second video content item is selected as the at least one target video content item, from among the video content items except the at least one first video content item, based on the time stamp and the spatial information described in the each of the pieces of the metadata,
   in the reproducing, the at least one first video content item is switched to the at least one second video content item at a position corresponding to the reproduction start position, and the at least one second video content item is reproduced from the reproduction start position, and the switching in the reproducing is caused by switching, on at least a part of a display screen, from display of the at least one first video content item to display of the at least one second video content item.

2. The content reproduction method according to claim 1, wherein, in the selecting of the at least one target video content item, at least two video content items are selected from among the video content items as the at least one target video content item, based on the time stamp and the spatial information described in the each of the pieces of the metadata, and in the reproducing, the at least two video content items are simultaneously reproduced from the reproduction start position.

3. The content reproduction method according to claim 1, wherein the at least one second video content item is generated by capturing, from a different angle, a same subject as captured in the at least one first video content item.

4. The content reproduction method according to claim 1, wherein the spatial information is described in the metadata for each predetermined time interval.

5. The content reproduction method according to claim 1, wherein the spatial information includes position information indicating a position of the corresponding one of the cameras at the capturing time.

6. The content reproduction method according to claim 5, wherein the position information includes latitude and longitude of the corresponding one of the cameras at the capturing time.

7. The content reproduction method according to claim 1, wherein the spatial information includes an altitude of the corresponding one of the cameras at the capturing time.

8. The content reproduction method according to claim 1, wherein the spatial information includes an orientation of the corresponding one of the cameras at the capturing time.

9. The content reproduction method according to claim 1, wherein the spatial information includes at least one of a temperature and a humidity of space in which the corresponding one of the cameras is present at the capturing time.

10. The content reproduction method according to claim 1, wherein the selecting of the at least one target video content item includes: selecting a plurality of first video content items from among the video content items based on the time stamp described in the each of the pieces of the metadata; and selecting the at least one target video content item from among the selected first video content items based on the spatial information described in the each of the pieces of the metadata, the spatial information being evaluated by an evaluation method defined in a predetermined evaluation mode.

11. The content reproduction method according to claim 10, wherein the selecting of the at least one target video content item is performed based on the spatial information described in the each of the pieces of the metadata, the spatial information being evaluated by an evaluation method of evaluating the spatial information as defined in an evaluation mode designated from among a plurality of evaluation modes.

12. The content reproduction method according to claim 10, wherein the selecting of the at least one target video content item is performed by using an evaluation method of evaluating the spatial information, the evaluation method being defined in an evaluation mode designated by a user from among a plurality of evaluation modes.

13. The content reproduction method according to claim 1, wherein in the selecting of the at least one target video content item is performed based on a subject captured in the at least one target video content item in addition to the time stamp and the spatial information described in the each of the pieces of the metadata.

14. The content reproduction method according to claim 13, wherein the selecting of the at least one target video content item includes: selecting at least two video content items based on the time stamp and the spatial information described in the each of the pieces of the metadata; and selecting, from among the at least two video content items, the at least one target video content item capturing a same subject as a subject captured in a currently-reproducing video content item.

15. The content reproduction method according to claim 14, wherein the subject is a person.

16. A content reproduction system that selects a plurality of video content items and reproduces the video content items, the content reproduction system comprising:

a plurality of content imaging devices each including a camera that captures a video content item; and the content reproduction apparatus that selects at least one video content item from video content items captured by the content imaging devices and reproduces the at least one video content item, wherein each of the video content items is associated with metadata that describes (a) a time stamp indicating a capturing time and (b) spatial information indicating features of space relating to the camera at the capturing time, the content reproduction apparatus includes:

a selection unit configured to select at least one target video content item to be reproduced from among the video content items based on the time stamp and the spatial information described in each of pieces of metadata including the metadata, the pieces of the metadata each being associated with a corresponding one of the video content items;

a determination unit configured to determine a reproduction start position of the at least one target video content item based on the time stamp described in the metadata associated with the at least one target video content item; and a reproduction unit configured to reproduce, from the reproduction start position determined by the determination unit, the at least one target video content item selected by the selection unit, wherein, when at least one first video content item among the video content items has already been reproduced, at least one second video content item is selected by the selecting unit as the at least one target video content item, from among the video content items except the at least one first video content item, based on the time stamp and the spatial information described in the each of the pieces of the metadata, the at least one first video content item is switched by the reproduction unit to the at least one second video content item at a position corresponding to the reproduction start position, and the at least one second video content item is reproduced from the reproduction start position, and the switching by the reproduction unit is caused by switching, on at least a part of a display screen, from display of the at least one first video content item to display of the at least one second video content item.

17. The content reproduction system according to claim 16, wherein each of the content imaging devices includes:

a camera capturing a video content item;

a storage unit configured to store the video content item captured by the camera associated with metadata describing (a) a time stamp indicating a capturing time and (b) spatial information indicating features of space related to the camera at the capturing time.

18. The content imaging device according to claim 17, wherein the spatial information includes an orientation of the camera at the capturing time.

* * * * *